US010856012B2

(12) United States Patent
Guleryuz et al.

(10) Patent No.: US 10,856,012 B2
(45) Date of Patent: Dec. 1, 2020

(54) METHOD AND APPARATUS FOR PREDICTING VIDEO SIGNAL USING PREDICTED SIGNAL AND TRANSFORM-CODED SIGNAL

(71) Applicant: LG ELECTRONICS INC., Seoul (KR)

(72) Inventors: Onur Gonen Guleryuz, San Francisco, CA (US); Amir Said, Cupertino, CA (US); Sehoon Yea, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 642 days.

(21) Appl. No.: 15/107,042

(22) PCT Filed: Dec. 22, 2014

(86) PCT No.: PCT/KR2014/012623
§ 371 (c)(1),
(2) Date: Jun. 21, 2016

(87) PCT Pub. No.: WO2015/093909
PCT Pub. Date: Jun. 25, 2015

(65) Prior Publication Data
US 2016/0337646 A1    Nov. 17, 2016

Related U.S. Application Data

(60) Provisional application No. 61/941,498, filed on Feb. 19, 2014, provisional application No. 61/941,499, (Continued)

(51) Int. Cl.
*H04N 19/176* (2014.01)
*H04N 19/91* (2014.01)
(Continued)

(52) U.S. Cl.
CPC ............ *H04N 19/91* (2014.11); *H04N 19/11* (2014.11); *H04N 19/124* (2014.11);
(Continued)

(58) Field of Classification Search
CPC .... H04N 19/176; H04N 19/147; H04N 19/46; H04N 19/593
See application file for complete search history.

(56) References Cited

U.S. PATENT DOCUMENTS

| 5,867,416 A | 2/1999 | Feldmann et al. |
| 5,933,193 A | 8/1999 | Niesen |

(Continued)

FOREIGN PATENT DOCUMENTS

| CN | 102572426 A | 7/2012 |
| CN | 102625102 A | 8/2012 |

(Continued)

OTHER PUBLICATIONS

XP 030080789, Orthonormal Integer Block Transforms for Lossless Coding: Design and Performance Analysis; Abhayaratne et al., 2003, Netherlands, Visual Communications and Image Processing, pp. 1-11.
(Continued)

*Primary Examiner* — Dave Czekaj
*Assistant Examiner* — Berteau Joisil
(74) *Attorney, Agent, or Firm* — Dentons US LLP

(57) ABSTRACT

Disclosed herein is a method of encoding a video signal, comprising receiving an original video signal; comparing the original video signal with available reconstructed signals; generating a transform-coded correction signal based on a result of the comparison; generating a prediction signal based on the transform-coded correction signal and the
(Continued)

available reconstructed signals; and reconstructing a signal by adding the transform-coded correction signal to the prediction signal.

18 Claims, 21 Drawing Sheets

Related U.S. Application Data filed on Feb. 19, 2014, provisional application No. 61/919,803, filed on Dec. 22, 2013.

(51) Int. Cl.

| | | |
|---|---|---|
| H04N 19/593 | (2014.01) | |
| H04N 19/126 | (2014.01) | |
| H04N 19/154 | (2014.01) | |
| H04N 19/46 | (2014.01) | |
| H04N 19/192 | (2014.01) | |
| H04N 19/11 | (2014.01) | |
| H04N 19/147 | (2014.01) | |
| H04N 19/124 | (2014.01) | |
| H04N 19/13 | (2014.01) | |
| H04N 19/15 | (2014.01) | |
| H04N 19/61 | (2014.01) | |

(52) U.S. Cl.
CPC ........... *H04N 19/126* (2014.11); *H04N 19/13* (2014.11); *H04N 19/147* (2014.11); *H04N 19/15* (2014.11); *H04N 19/154* (2014.11); *H04N 19/176* (2014.11); *H04N 19/192* (2014.11); *H04N 19/46* (2014.11); *H04N 19/593* (2014.11); *H04N 19/61* (2014.11)

(56) References Cited

U.S. PATENT DOCUMENTS

| | | | |
|---|---|---|---|
| 7,817,723 B2 | 10/2010 | Wiegand et al. | |
| 2004/0091055 A1* | 5/2004 | Williams | H04L 27/2601 375/259 |
| 2007/0110153 A1 | 5/2007 | Cho et al. | |
| 2007/0189626 A1 | 8/2007 | Tanizawa et al. | |
| 2007/0223582 A1 | 9/2007 | Borer | |
| 2007/0242895 A1* | 10/2007 | Bandou | H04N 19/147 382/251 |
| 2008/0013847 A1 | 1/2008 | Li | |
| 2009/0168872 A1* | 7/2009 | Jeon | H04N 19/176 375/240.12 |
| 2009/0168890 A1 | 7/2009 | Holcomb | |
| 2009/0192711 A1 | 7/2009 | Tang | |
| 2010/0189180 A1 | 7/2010 | Narroschke et al. | |
| 2010/0238997 A1* | 9/2010 | Yang | H04N 19/105 375/240.03 |
| 2011/0153699 A1 | 6/2011 | Reznik et al. | |
| 2012/0027083 A1* | 2/2012 | Narroschke | H04N 19/70 375/240.03 |
| 2012/0230422 A1 | 9/2012 | Korodi et al. | |
| 2012/0307890 A1 | 12/2012 | Lu et al. | |
| 2013/0010859 A1 | 1/2013 | Schwaab et al. | |
| 2013/0208790 A1 | 8/2013 | Davies | |
| 2013/0235938 A1 | 9/2013 | Huang et al. | |
| 2013/0251028 A1 | 9/2013 | Au et al. | |
| 2013/0251030 A1* | 9/2013 | Wang | H04N 19/30 375/240.03 |
| 2013/0301724 A1 | 11/2013 | Boon et al. | |
| 2014/0072240 A1 | 3/2014 | Lee et al. | |
| 2014/0307782 A1 | 10/2014 | Shima | |
| 2015/0172660 A1 | 6/2015 | Wang et al. | |
| 2015/0172662 A1* | 6/2015 | Pearson | H04N 19/124 375/240.03 |

FOREIGN PATENT DOCUMENTS

| | | |
|---|---|---|
| CN | 103096053 A | 5/2013 |
| EP | 2595382 A2 | 5/2013 |
| EP | 2595387 A1 | 5/2013 |
| GB | 2481856 A | 11/2012 |
| JP | 2009-528762 A | 8/2009 |
| JP | 2010057129 A | 3/2010 |
| JP | 2012104926 A | 5/2012 |
| JP | 20120147268 A | 8/2012 |
| JP | 2014-504103 A | 2/2014 |
| TW | 201028018 A | 7/2010 |
| WO | 2012004616 A1 | 1/2012 |
| WO | 2013/032312 A2 | 3/2013 |

OTHER PUBLICATIONS

Wei, Pu, et al., RCE1:Descriptions and Results for Experiments 1, 2, 3, and 4, Joint Collaborative Team on Video Coding (JC-VC) of ITU-T SG 16WP 3 and ISO/IEC JTC 1/SC 29/WG 11, JCTVCO0202_v3, Oct. 1-Nov. 1, 2013, pp. 1-10.
XP 030007562: Feng Wu, Joint Collaborative Team on Video Coding (JCT-VC) of ITU-T SG16 WP3 and ISO/IEC JTC1/SC29/WG11 "Description of Video Coding Technology Proposal by Microsoft," Microsoft Research Asia, Apr. 15-23, 2010, pp. 1-15.
Akiyuki Tanizawa, Takeshi Chujoh, Adaptive Quantization Matrix Selection on KTA Software, ITU—Telecommunications Standardization Sector Study Group 16 Question 6 :Video Coding Experts Group, 29th Meeting: Klagenfurt, Austria, Jul. 17-18, 2006 pp. 1-4.
Lan, et al.: "Screen content coding", JCTVC-B084, Joint Collaborative Team on Video Coding (JCT-VC) of ITU-T SG16 WP3 and ISO/IEC JTC1/SC29/WG11, 2nd Meeting, Geneva, CH, Jul. 21-28, 2010.
Amir Said et al, "Improving Hybrid Coding via control of Quantization errors in the spatial and frequency domains," LG Electronics Mobile Research, San Jose California, 2014 IEEE International Conference on Image Processing (ICIP) Jan. 19, 2015, downloaded Aug. 19, 2020, (pp. 5621-5625).

* cited by examiner

【Figure 1】
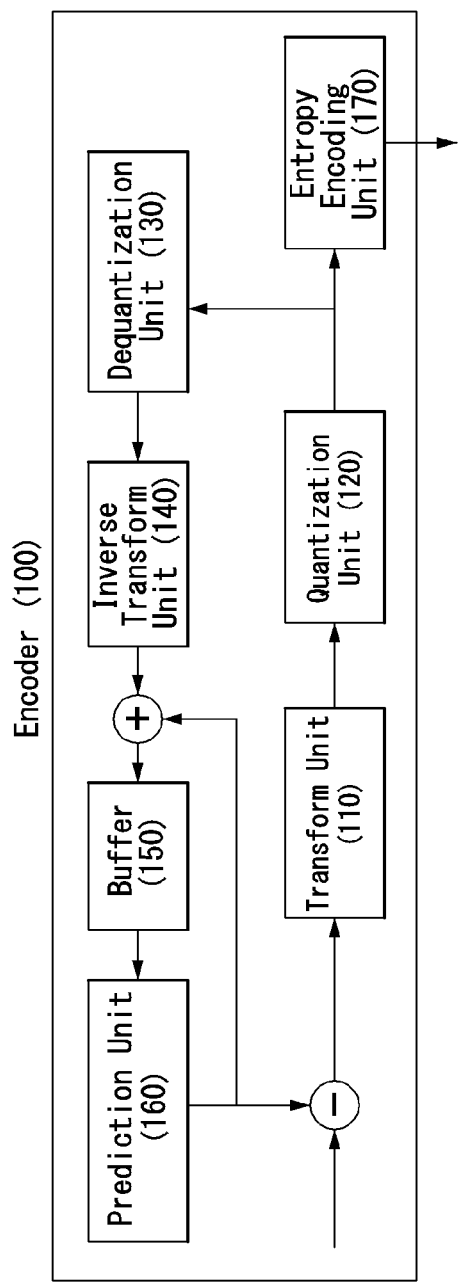

【Figure 2】
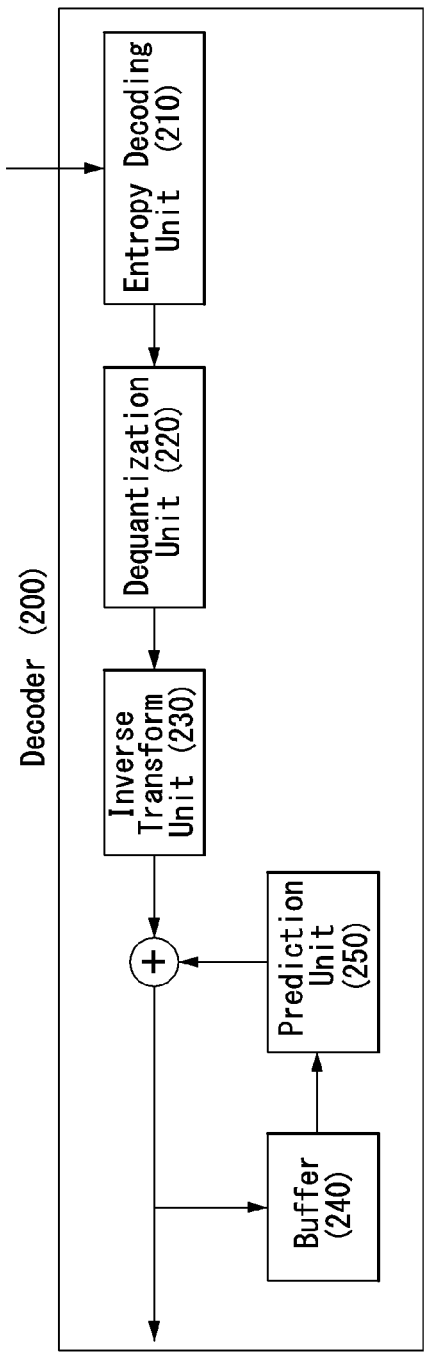

【Figure 3】
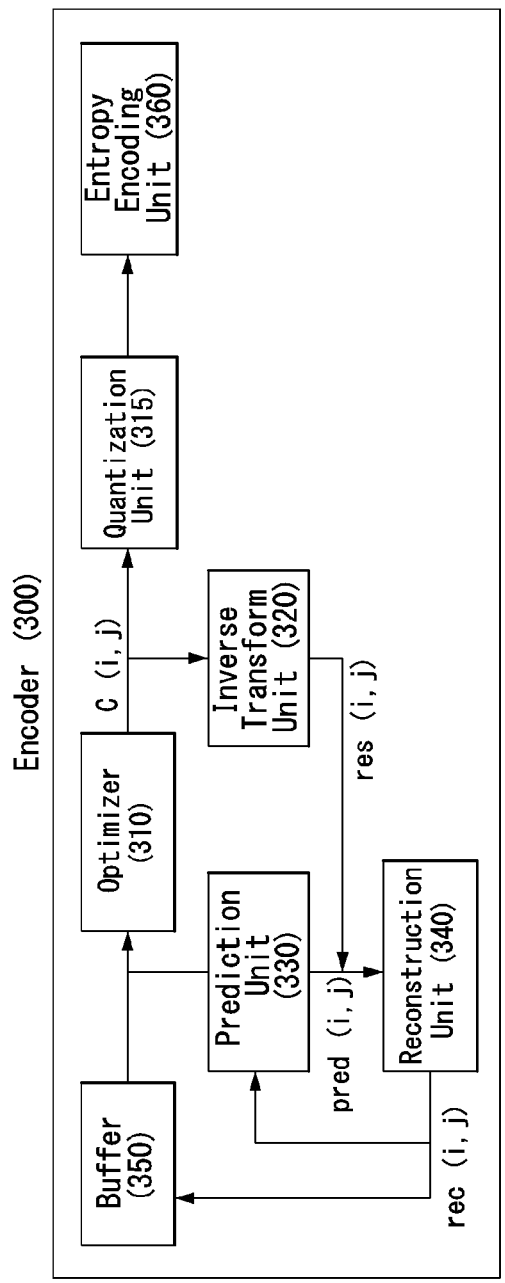

[Figure 4]
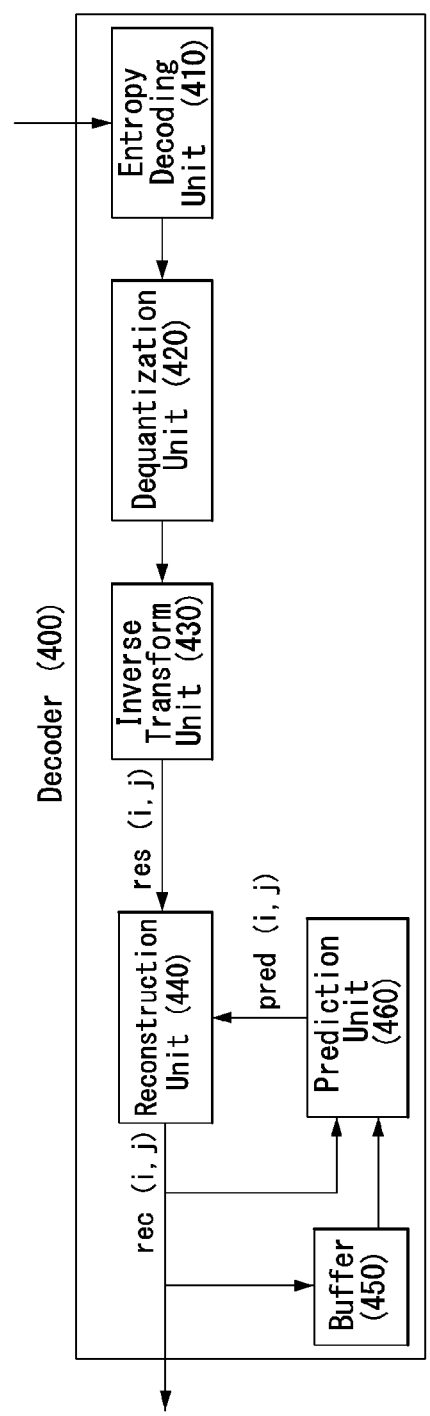

【Figure 5】
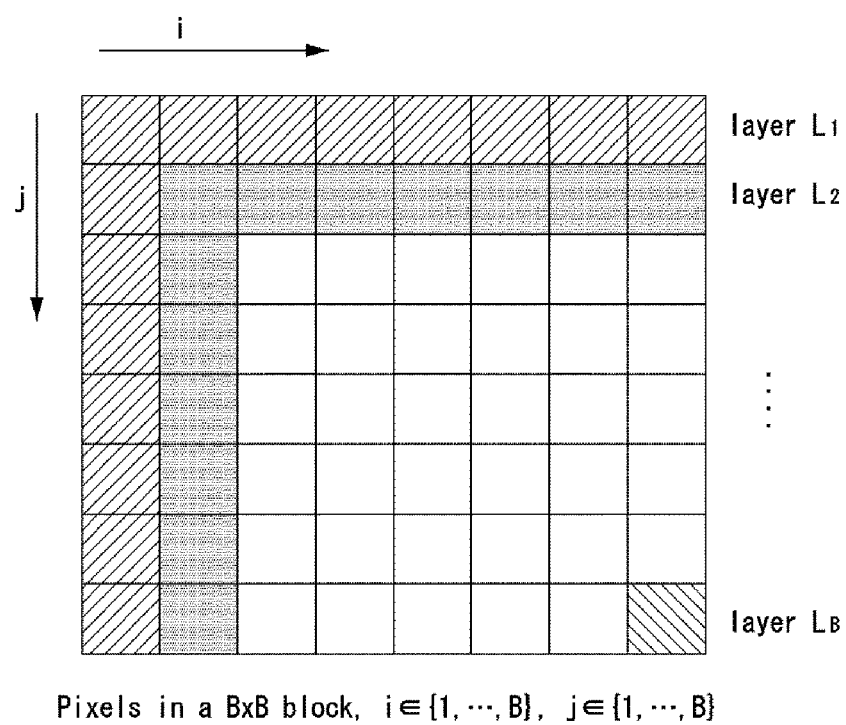
Pixels in a BxB block, $i \in \{1, \cdots, B\}$, $j \in \{1, \cdots, B\}$ 【Figure 6】
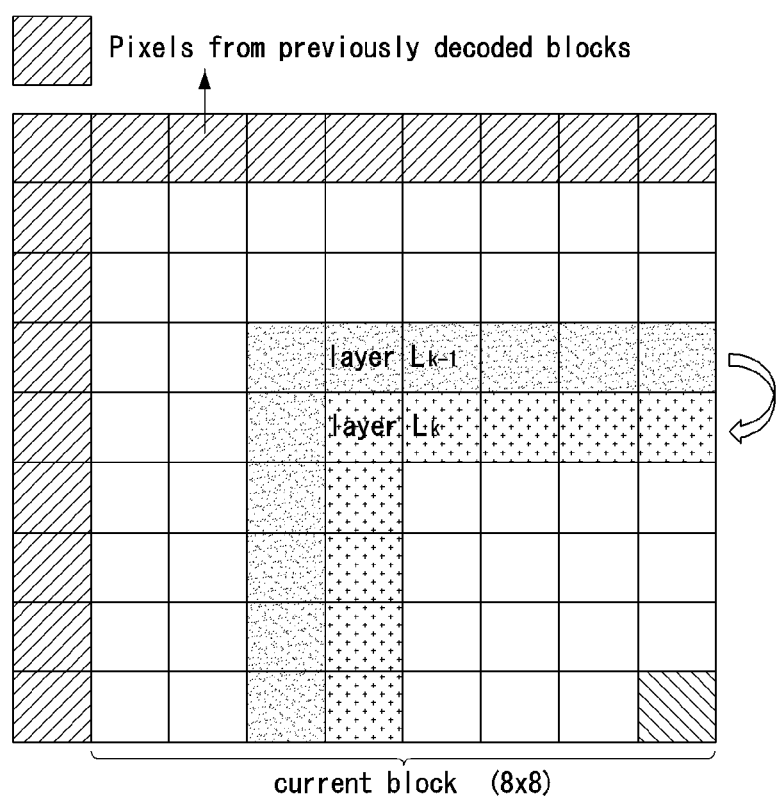

【Figure 7】
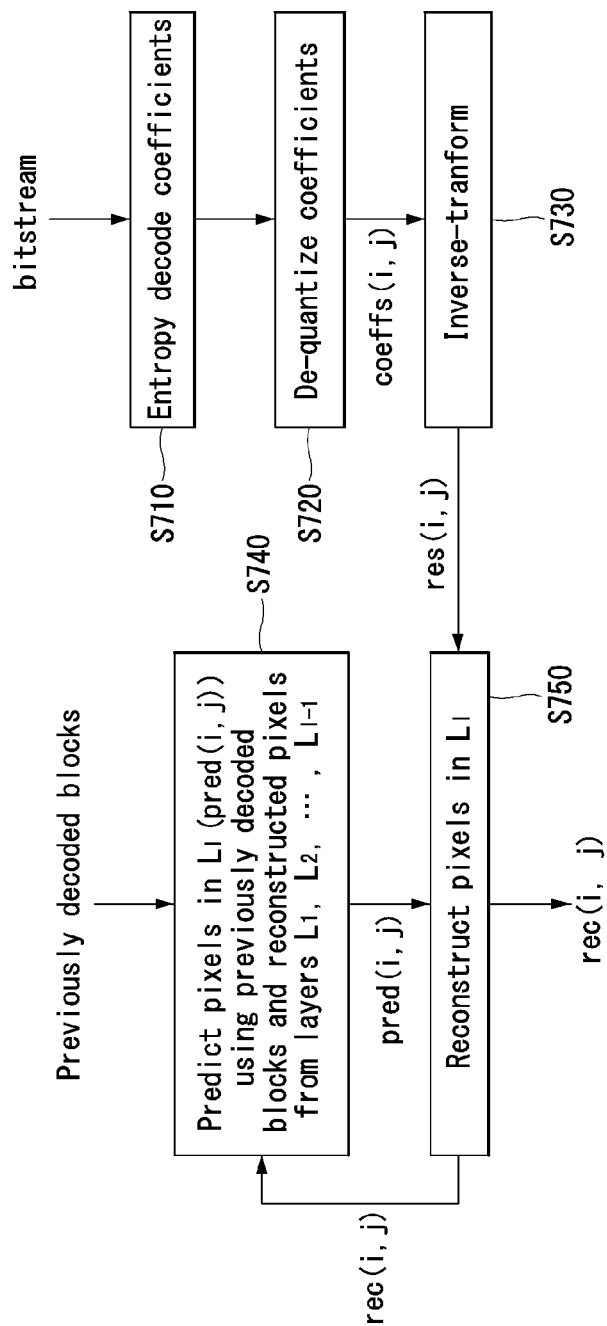

【Figure 8】
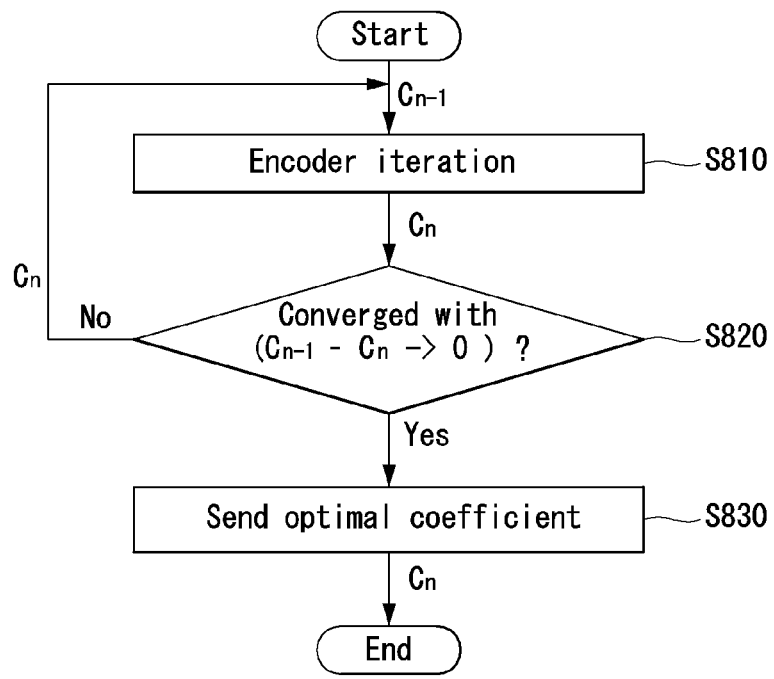

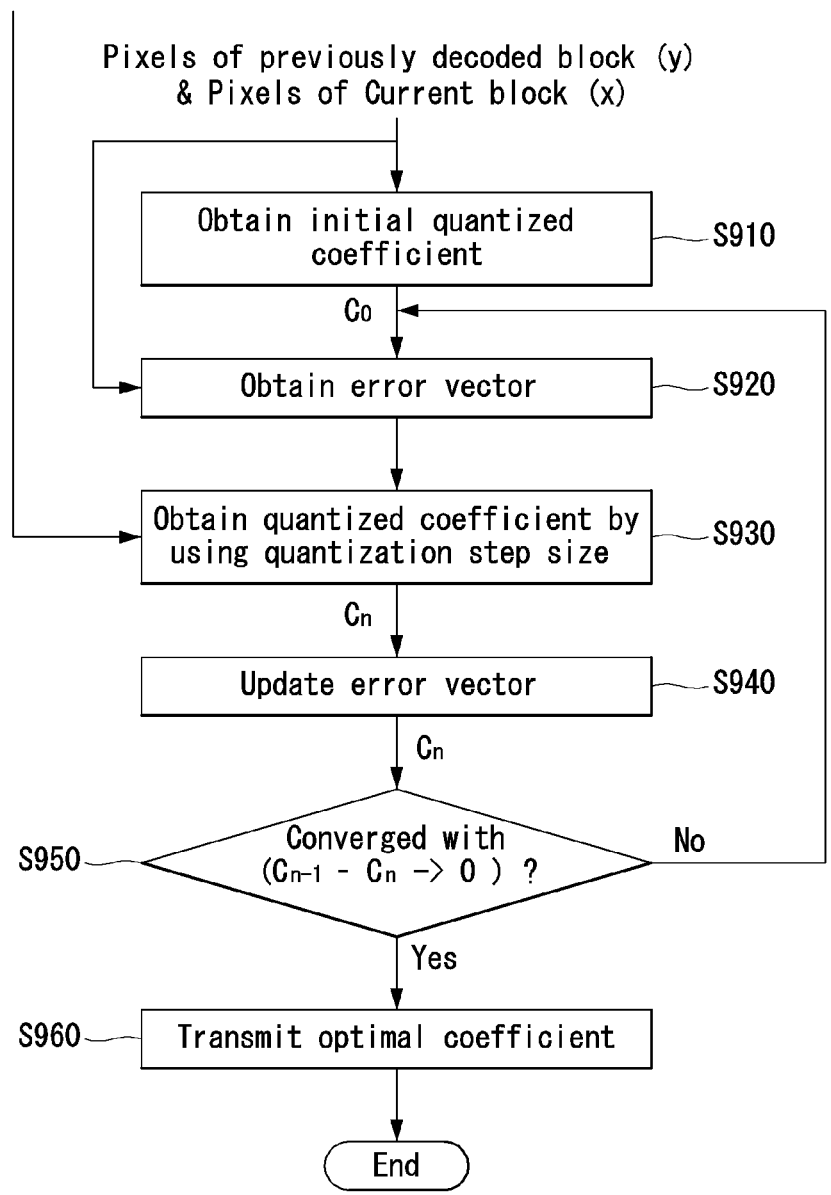
[Figure 9]

【Figure 10】
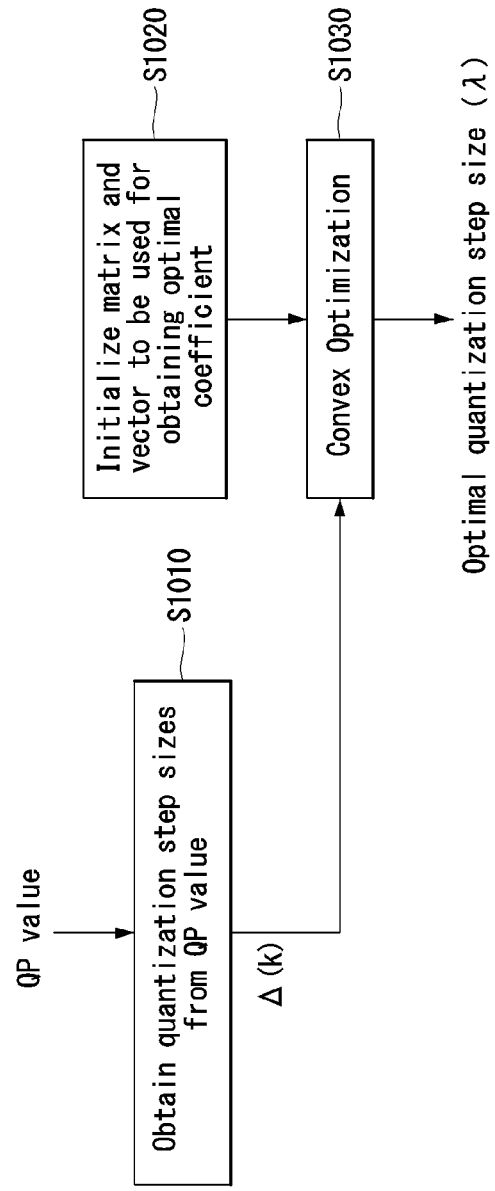

[Figure 11]
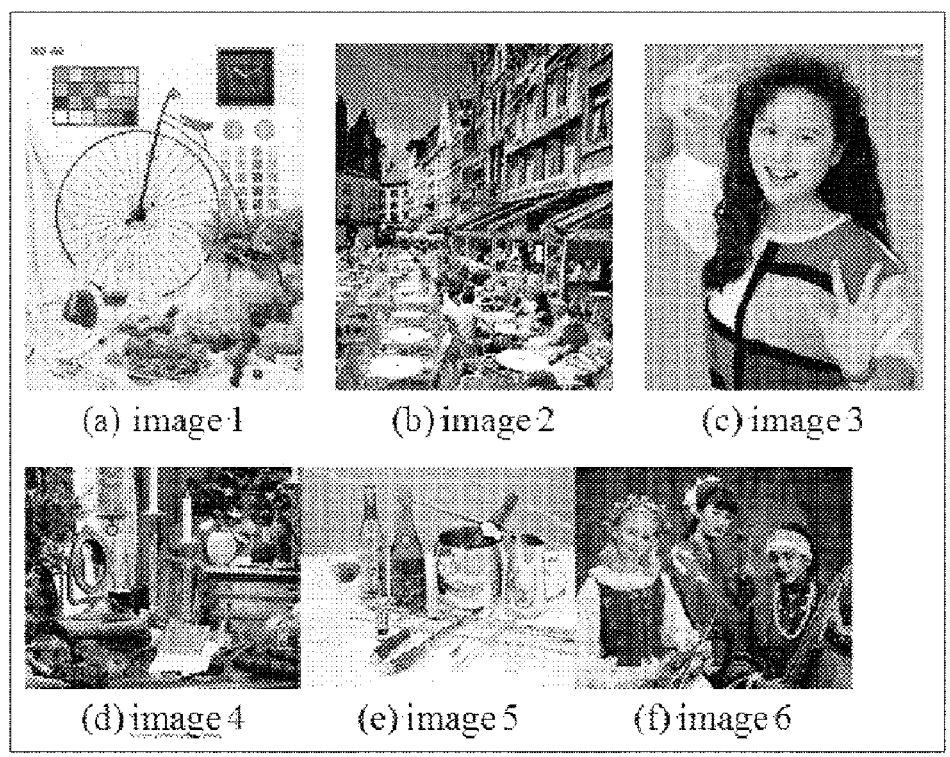

【Figure 12】

|  | % Rate Gain |
|---|---|
| image 1 | 12.0% |
| image 2 | 13.0% |
| image 3 | 11.6% |
| image 4 | 8.9% |
| image 5 | 12.4% |
| image 6 | 7.9% |

(a) Images

|  | % Rate Gain |
|---|---|
| Slide Editing | 6.9% |
| China Speed | 5.0% |
| Slide Show | 4.1% |
| Foreman | 1.3% |
| Mobile | 1.3% |
| Flower | 1.0% |

(b) Video

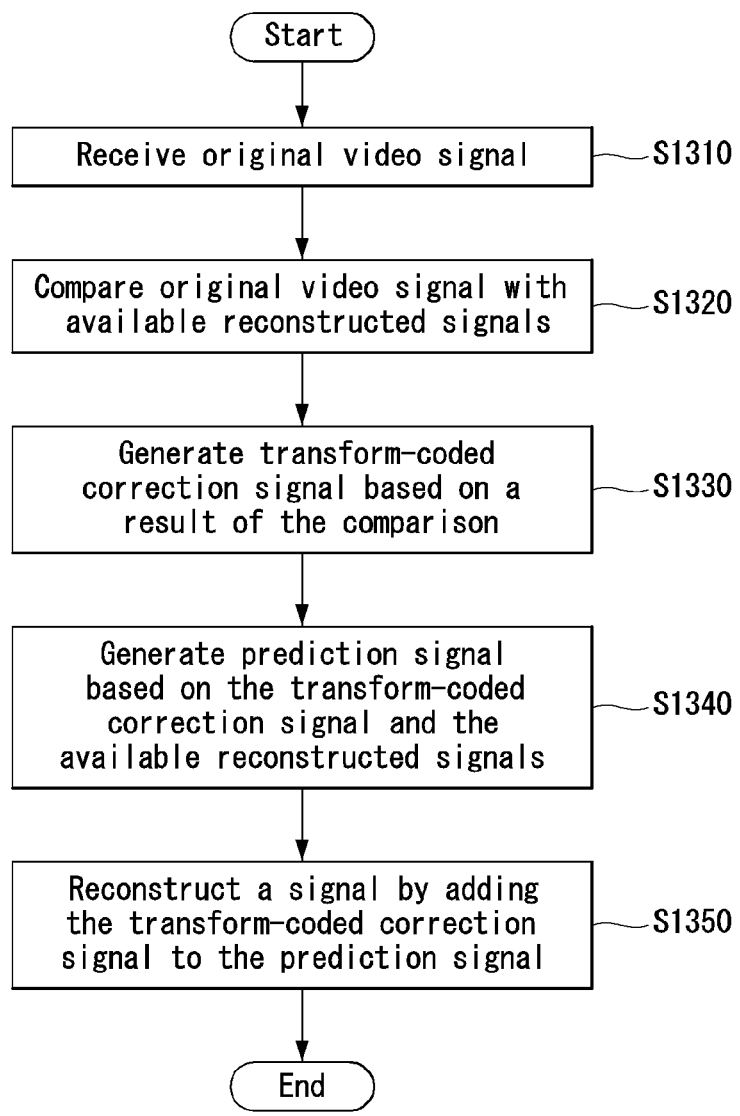
[Figure 13]

[Figure 14]
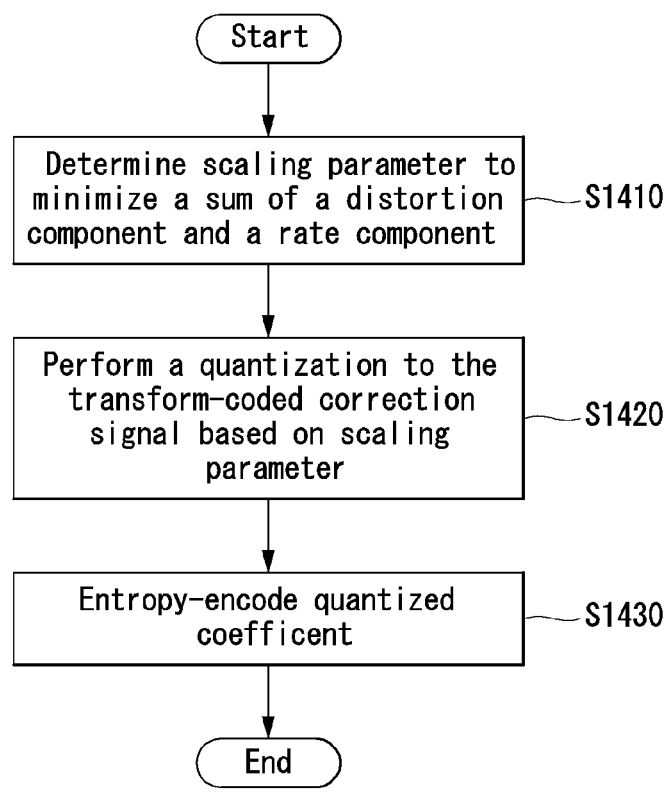

[Figure 15]
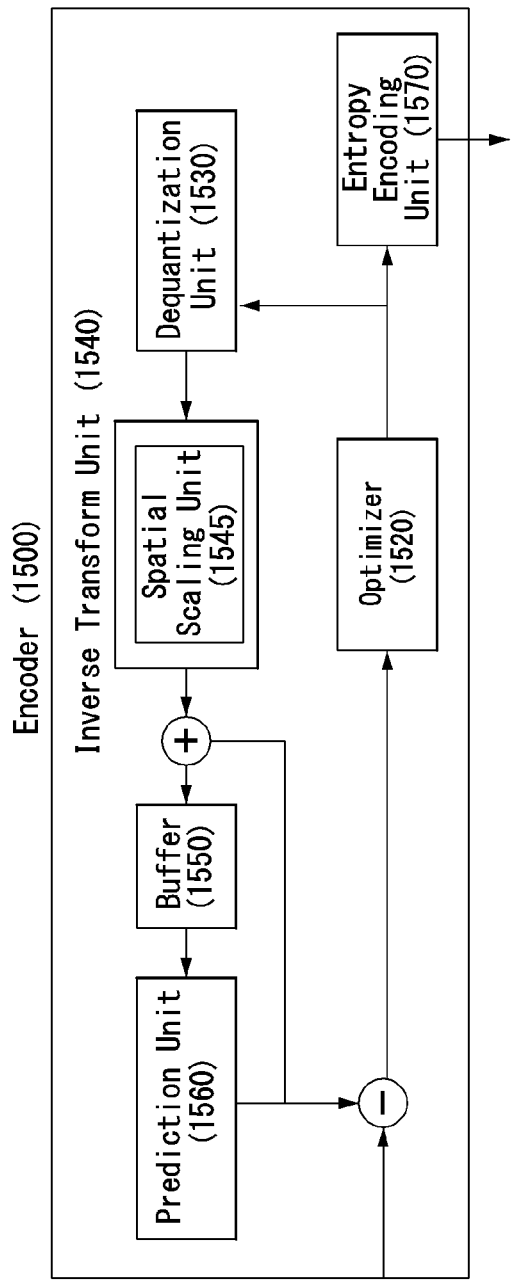

【Figure 16】
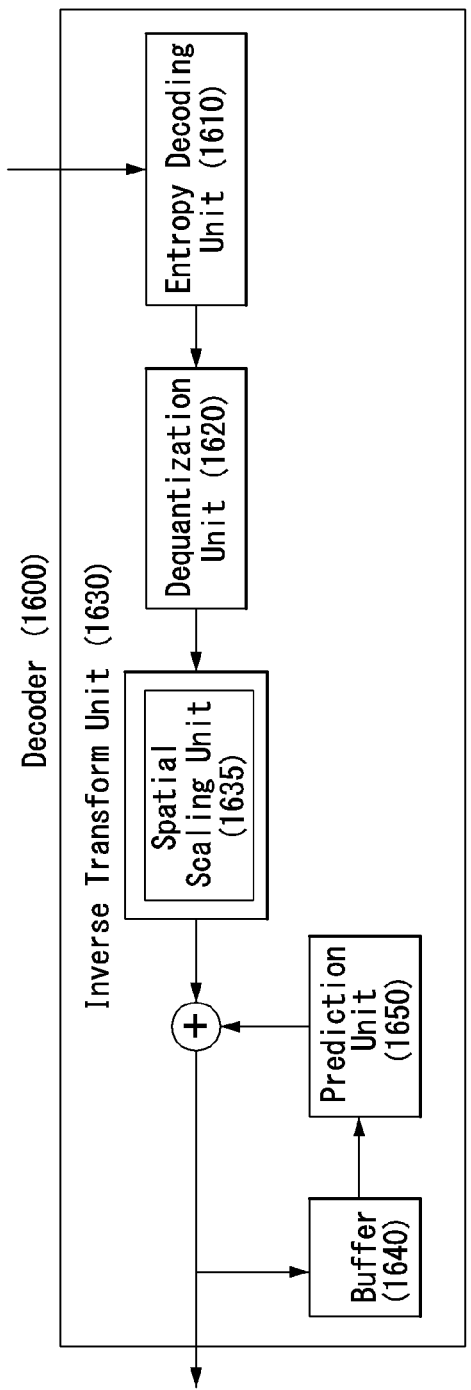

[Figure 17]
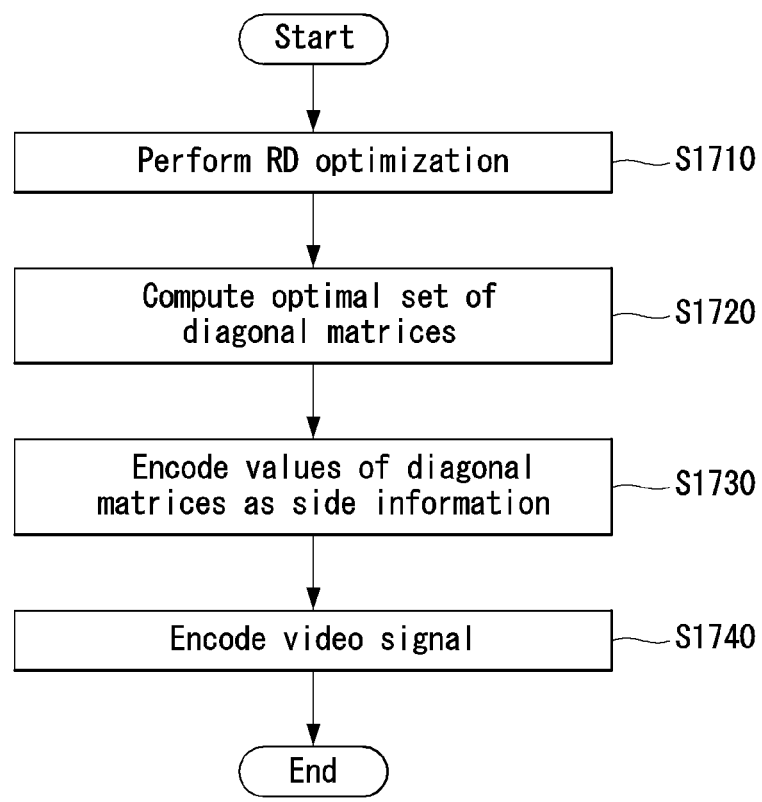

【Figure 18】
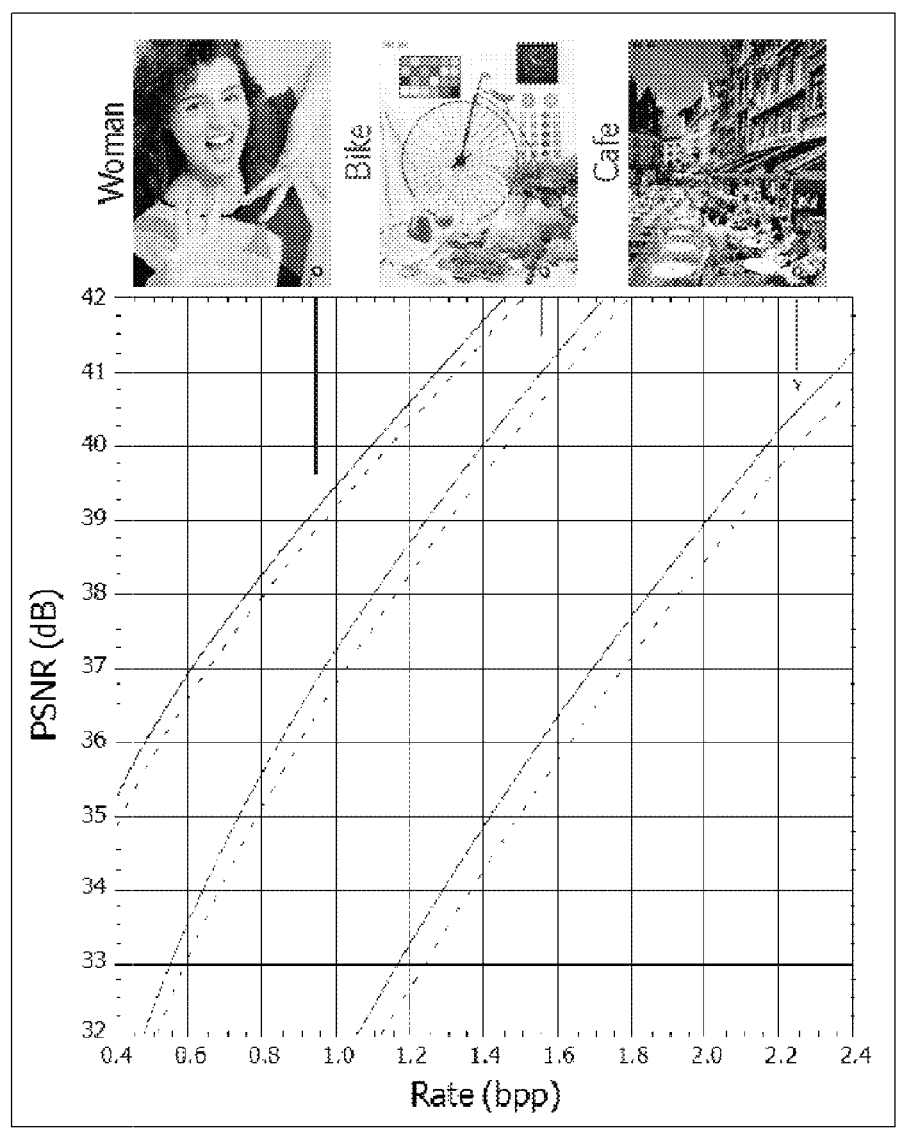

【Figure 19】
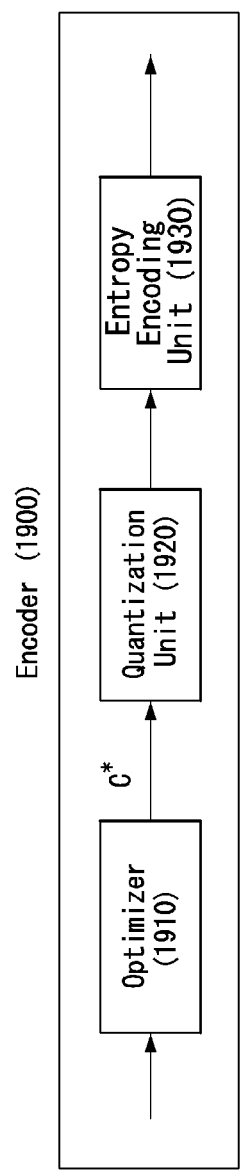

[Figure 20]
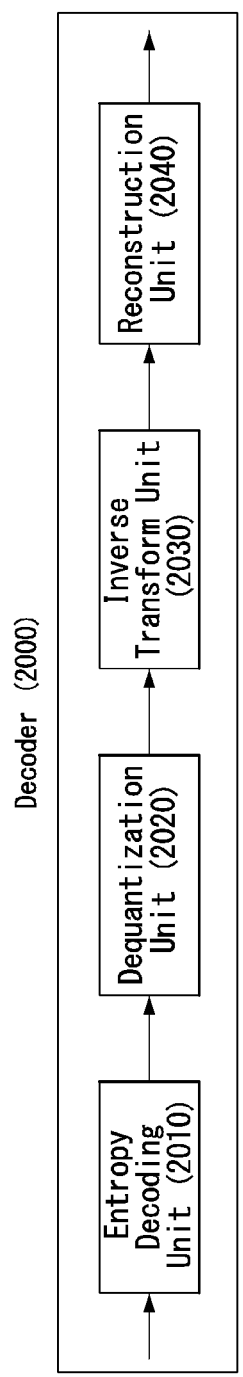

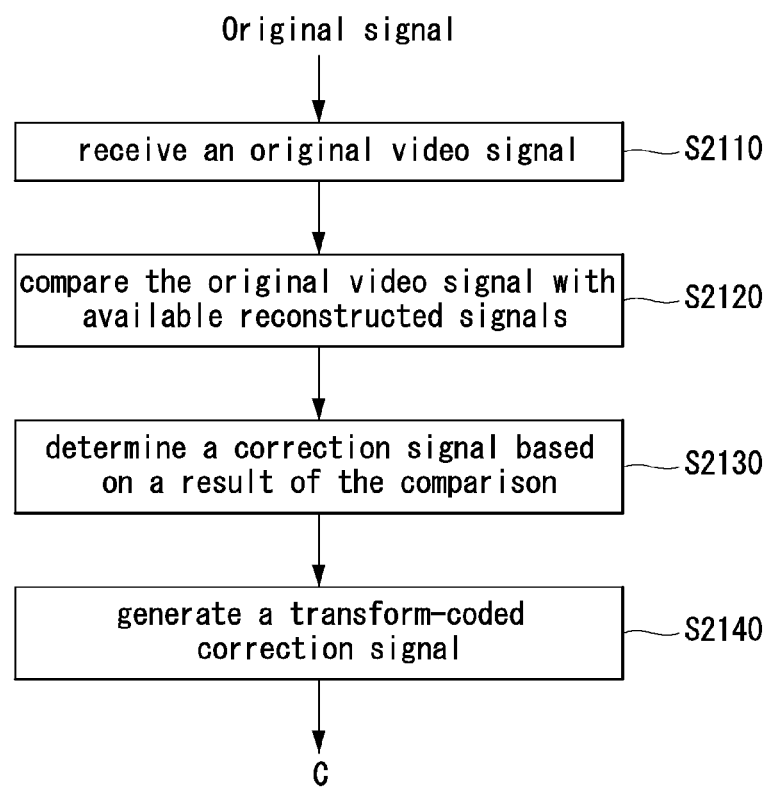
[Figure 21]

METHOD AND APPARATUS FOR PREDICTING VIDEO SIGNAL USING PREDICTED SIGNAL AND TRANSFORM-CODED SIGNAL

This application is a National Stage Entry of International Application No. PCT/KR2014/012623, filed on Dec. 22, 2014, and claims the benefit of and priority to Provisional Application Nos. 61/941,498, filed Feb. 19, 2014, 61/941,499, filed Feb. 19, 2014, and 61/919,803, filed Dec. 22, 2013, all of which are hereby incorporated by reference in their entirety for all purposes as if fully set forth herein.

TECHNICAL FIELD

The present invention relates to a method and apparatus for encoding and decoding a video signal and, more particularly, to a prediction technology using a predicted signal and a transform-coded signal.

BACKGROUND ART

Compression coding means a set of signal processing technologies for sending digitalized information through a communication line or storing digitalized information in a form suitable for a storage medium. Media, such as videos, images, and voice may be the subject of compression coding. In particular, a technique for performing compression coding on videos is called video compression.

Many media compression technologies are based on two approach methods: predictive coding and transform coding. In particular, a hybrid coding technology includes spatially predicting samples using previously decoded context values and performing transform coding on predicted errors. Such a process is performed on a Gaussian signal so that it has an optimized a Rate Distortion (RD) value.

However, common video signals need to be more efficiently coded because they have structures not suitable for Gaussian signals.

Meanwhile, an importance may be different in each of errors occurring in other parts of a block. Accordingly, there is a need for a method capable of controlling errors in both a space domain and a frequency domain.

DISCLOSURE

Technical Problem

An embodiment of the present invention is directed to more efficiently coding a signal having an edge and directional structure.

An embodiment of the present invention is directed to non-casually predicting a video signal using a transform-coded signal together with a predicted signal.

An embodiment of the present invention is directed to coding a video signal based on non-orthogonal transform.

An embodiment of the present invention is directed to obtaining an optimized transform coefficient that minimizes distortion.

An embodiment of the present invention is directed to deriving a Rate Distortion (RD)-optimized quantization step size.

An embodiment of the present invention is directed to representing a non-casual coding technology to which the present invention may be applied using non-orthogonal transform having a form and parameters.

An embodiment of the present invention is directed to controlling a quantization error in both a space domain and a frequency domain.

An embodiment of the present invention is directed to defining different diagonal matrices in order to differentiate the importance of errors on the space domain.

An embodiment of the present invention is directed to proposing a method of calculating optimized diagonal matrices from a viewpoint of Rate Distortion (RD).

An embodiment of the present invention is directed to proposing a method of more finely controlling a quantization error on the space domain.

Technical Solution

The present invention proposes a method of more efficiently coding a signal having an edge and directional structure.

Furthermore, the present invention proposes a method of non-casually predicting a video signal using a transform-coded signal together with a predicted signal.

Furthermore, the present invention proposes a method of coding a video signal based on non-orthogonal transform.

Furthermore, the present invention proposes a quantization algorithm for obtaining an optimized transform coefficient.

Furthermore, the present invention proposes a method of deriving an optimized quantization step size.

Furthermore, the present invention proposes a non-casual coding technology that may be represented by non-orthogonal transform having a form and parameters.

Furthermore, the present invention proposes a method of generating an optimized prediction signal using all the already reconstructed signals and a context signal.

Furthermore, the present invention proposes a method of controlling a quantization error in both a space domain and a frequency domain.

Furthermore, the present invention defines different diagonal matrices in order to differentiate the importance of errors on the space domain.

Furthermore, the present invention proposes a method of calculating optimized diagonal matrices from a viewpoint of Rate Distortion (RD).

Furthermore, the present invention proposes a method of more finely controlling a quantization error on the space domain.

Advantageous Effects

The present invention can perform more elaborate and advanced prediction using all the decoded information.

Furthermore, the present invention can code a signal having an edge and directional structure more efficiently by non-casually predicting a video signal using a transform-coded signal together with a predicted signal.

Furthermore, the present invention can perform more elaborate and advanced prediction by proposing a non-casual coding technology that may be represented by non-orthogonal transform having a form and parameters.

Furthermore, the present invention can minimize a quantization error by proposing a quantization algorithm for obtaining an optimized transform coefficient.

Furthermore, the present invention can perform more advanced coding by proposing a method of deriving an optimized quantization step size.

Furthermore, the present invention can generate an optimized prediction signal using all the already reconstructed signals and a context signal.

Furthermore, the present invention can perform more advanced coding by controlling a quantization error in both a space domain and a frequency domain.

DESCRIPTION OF DRAWINGS

FIGS. 1 and 2 are schematic block diagrams of an encoder and a decoder in which video coding is performed;

FIGS. 3 and 4 illustrate embodiments to which the present invention may be applied and are schematic block diagrams of an encoder and a decoder to which an advanced coding method has been applied;

FIGS. 5 and 6 illustrate embodiments to which the present invention may be applied and define layers illustrating a method of performing prediction using previously coded pixels;

FIG. 7 illustrates an embodiment to which the present invention may be applied and is a flowchart illustrating a method of performing prediction using previously coded pixels for each layer;

FIG. 8 illustrates an embodiment to which the present invention may be applied and is a flowchart illustrating a quantization process for obtaining an optimized coefficient;

FIG. 9 illustrates an embodiment to which the present invention may be applied and is a detailed flowchart illustrating a quantization process for obtaining an optimized coefficient;

FIG. 10 illustrates an embodiment to which the present invention may be applied and is a flowchart illustrating a process of obtaining an optimized quantization step size;

FIGS. 11 and 12 illustrate embodiments to which the present invention may be applied, wherein FIG. 11 illustrates test images to which the present invention has been applied and FIG. 12 illustrates percentages of rate gains to test images;

FIG. 13 illustrates an embodiment to which the present invention may be applied and is a schematic flowchart illustrating an improved predictive coding method;

FIG. 14 illustrates an embodiment to which the present invention may be applied and is a schematic flowchart illustrating a method of performing quantization based on an optimized quantization step size;

FIGS. 15 and 16 illustrate embodiments to which the present invention may be applied and are schematic block diagrams of an encoder and a decoder to which an advanced coding method has been applied through control of a quantization error;

FIG. 17 illustrates an embodiment to which the present invention may be applied and is a flowchart illustrating a process of obtaining a scaling diagonal matrix through a Rate Distortion (RD) optimization process;

FIG. 18 illustrates an embodiment to which the present invention may be applied and is a graph illustrating a comparison between the coding gains of respective images in the case in which coding is performed using an optimized scaling matrix and the case in which coding is performed using an existing method;

FIGS. 19 and 20 illustrate embodiments to which the present invention may be applied and are schematic block diagrams of an encoder and a decoder to which an advanced coding method has been applied; and FIG. 21 illustrates an embodiment to which the present invention may be applied and is a schematic flowchart illustrating an advanced video coding method.

BEST MODE

An embodiment of the present invention provides a method of encoding a video signal, comprising receiving an original video signal; comparing the original video signal with available reconstructed signals; generating a transform-coded correction signal based on a result of the comparison; generating a prediction signal based on the transform-coded correction signal and the available reconstructed signals; and reconstructing a signal by adding the transform-coded correction signal to the prediction signal.

In an aspect of the present invention, the method further includes determining a scaling parameter to minimize a sum of a distortion component and a rate component, and performing quantization to the transform-coded correction signal based on the scaling parameter.

In an aspect of the present invention, the distortion component is indicative of total distortion between the original video signal and the reconstructed signal, and the rate component is indicative of a number of bits required to send a quantized coefficient.

In an aspect of the present invention, the scaling parameter is determined from a quantization parameter value.

In an aspect of the present invention, the method further includes decomposing the original video signal to be coded into a plurality of layers.

In an aspect of the present invention, a nonorthogonal transform matrix is used to reconstruct the signal.

Another embodiment of the present invention provides a method of decoding a video signal, comprising: receiving the video signal including an optimal quantized coefficient; obtaining a residual error vector based on the optimal quantized coefficient; and reconstructing the video signal by adding the residual signal to a prediction signal, wherein the optimal quantized coefficient has been obtained based on all the previously reconstructed signals.

In an aspect of the present invention, the decoding method further includes extracting a scaling parameter from the video signal, and performing quantization to the optimal quantized coefficient based on the scaling parameter.

Another embodiment of the present invention provides an apparatus of encoding a video signal, comprising: a receiving unit configured to receive an original video signal; an optimizer configured to compare the original video signal with available reconstructed signals, and generate a transform-coded correction signal based on a result of the comparison; a prediction unit configured to generate a prediction signal based on the transform-coded correction signal and the available reconstructed signals; and a reconstruction unit configured to reconstruct a signal by adding the transform-coded correction signal to the prediction signal.

In an aspect of the present invention, the encoding apparatus further includes the optimizer configured to determining a scaling parameter to minimize a sum of a distortion component and a rate component, and a quantization unit configured to perform quantization to the transform-coded correction signal based on the scaling parameter.

Another embodiment of the present invention provides An apparatus of decoding a video signal, comprising: a receiving unit configured to receive the video signal including an optimal quantized coefficient; an inverse transform unit configured to obtain a residual error vector based on the optimal quantized coefficient; and a reconstruction unit configured to reconstruct the video signal by adding the residual signal to a prediction signal, wherein the optimal quantized coefficient has been obtained based on all the previously reconstructed signals.

In an aspect of the present invention, the decoding apparatus further includes an dequantization unit configured to extract a scaling parameter from the video signal, and perform a quantization to the optimal quantized coefficient based on the scaling parameter.

Mode for Invention

Hereinafter, exemplary elements and operations in accordance with embodiments of the present invention are described with reference to the accompanying drawings. It is however to be noted that the elements and operations of the present invention described with reference to the drawings are provided as only embodiments and the technical spirit and kernel configuration and operation of the present invention are not limited thereto.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process.

FIGS. 1 and 2 illustrate schematic block diagrams of an encoder and a decoder in which media coding is performed.

The encoder 100 of FIG. 1 includes a transform unit 110, a quantization unit 120, a dequantization unit 130, an inverse transform unit 140, a buffer 150, a prediction unit 160, and an entropy encoding unit 170. The decoder 200 of FIG. 2 includes an entropy decoding unit 210, a dequantization unit 220, an inverse transform unit 230, a buffer 240, and a prediction unit 250.

The encoder 100 receives the original video signal and generates a prediction error by subtracting a predicted signal, output by the prediction unit 160, from the original video signal. The generated prediction error is transmitted to the transform unit 110. The transform unit 110 generates a transform coefficient by applying a transform scheme to the prediction error.

The transform scheme may include, a block-based transform method and an image-based transform method, for example. The block-based transform method may include, for example, Discrete Cosine Transform (DCT) and Karhuhen-Loeve Transform. The DCT means that a signal on a space domain is decomposed into two-dimensional frequency components. A pattern having lower frequency components toward an upper left corner within a block and higher frequency components toward a lower right corner within the block is formed. For example, only one of 64 two-dimensional frequency components that is placed at the top left corner may be a Direct Current (DC) component and may have a frequency of 0. The remaining frequency components may be Alternate Current (AC) components and may include 63 frequency components from the lowest frequency component to higher frequency components. To perform the DCT includes calculating the size of each of base components (e.g., 64 basic pattern components) included in a block of the original video signal, the size of the base component is a discrete cosine transform coefficient.

Furthermore, the DCT is transform used for a simple expression into the original video signal components. The original video signal is fully reconstructed from frequency components upon inverse transform. That is, only a method of representing video is changed, and all the pieces of information included in the original video in addition to redundant information are preserved. If DCT is performed on the original video signal, DCT coefficients are crowded at a value close to 0 unlike in the amplitude distribution of the original video signal. Accordingly, a high compression effect can be obtained using the DCT coefficients.

The quantization unit 120 quantizes the generated transform coefficient and sends the quantized coefficient to the entropy encoding unit 170. The entropy encoding unit 170 performs entropy coding on the quantized signal and outputs an entropy-coded signal.

The quantization unit 120 maps a specific range of input values for input data to a single representative value. Quantization may be computed by dividing the input data by a quantization step size as in the following equation 1.

$$Y = \text{Sign}(X) * \text{Round}\left\{\frac{|X|}{Q}\right\} \quad \text{[Equation 1]}$$

In Equation 1, Y denotes quantized data, X denotes input data, and Q denotes a quantization step size. A function Sign( ) is operation for obtaining the sign of data, and a function Round( ) denotes round-off operation. The quantization step size may be represented by a quantization range. Furthermore, in this specification, the quantization step size may mean a scaling parameter. When video coding is performed, a quantization step size may be changed. A compression ration may be controlled using the changed quantization step size. Meanwhile, a quantization parameter using an integer value may be use instead of the quantization step size.

In a quantization process, as in the following equation 2, a quantized coefficient C' may be obtained by dividing an input transform coefficient C by a quantization step size Q.

$$C'=C/Q \quad \text{[Equation 2]}$$

In Equation 2, C' denotes a quantized coefficient, C denotes an input transform coefficient, and Q denotes a quantization step size.

Meanwhile, the quantized signal output by the quantization unit 120 may be used to generate a prediction signal. For example, the dequantization unit 130 and the inverse transform unit 140 within the loop of the encoder 100 may perform dequantization and inverse transform on the quantized signal so that the quantized signal is reconstructed into a prediction error. A reconstructed signal may be generated by adding the reconstructed prediction error to a prediction signal output by the prediction unit 160.

The buffer 150 stores the reconstructed signal for the future reference of the prediction unit 160. The prediction unit 160 generates a prediction signal using a previously reconstructed signal stored in the buffer 150.

The decoder 200 of FIG. 2 receives a signal output by the encoder 100 of FIG. 1. The entropy decoding unit 210 performs entropy decoding on the received signal. The dequantization unit 220 obtains a transform coefficient from the entropy-decoded signal based on information about a quantization step size. The inverse transform unit 230 obtains a prediction error by performing inverse transform on the transform coefficient. A reconstructed signal is generated by adding the obtained prediction error to a prediction signal output by the prediction unit 250.

The dequantization unit 220 may compute reconstructed data by multiplying quantized data by a dequantization scaling value Q as in the following equation 3.

$$X'=Y*Q \qquad \text{[Equation 3]}$$

In Equation 3, X' denotes reconstructed data, Y denotes quantized data, and Q denotes a dequantization scaling value. The dequantization scaling value Q may have the same value as a quantization step size.

The buffer 240 stores the reconstructed signal for the future reference of the prediction unit 250. The prediction unit 250 generates a prediction signal using a previously reconstructed signal stored in the buffer 240.

The present invention provides an intra prediction method in a hybrid video coder. Sample values to be compressed are predicted using previously coded context values, and predicted errors are transform-coded. Such a process may be performed on a Gaussian signal so that it has an optimized RD value. Common video signals include many signals not suitable for Gaussian signals. Accordingly, the present invention is targeted to such signals and proposes a technology for non-casually predicting each sample using a transform-coded sample and a context value together with a prediction sample. Such non-causal encoding may be represented by non-orthogonal transform including a form and parameters.

FIGS. 3 and 4 illustrate embodiments to which the present invention may be applied and are schematic block diagrams of an encoder and a decoder to which an advanced coding method has been applied.

The encoder 300 of FIG. 3 includes an optimizer 310, a quantization unit 315, a an inverse transform unit 320, a prediction unit 330, a reconstruction unit 340, a buffer 350, and an entropy encoding unit 360. The decoder 400 of FIG. 4 includes an entropy decoding unit 410, a dequantization unit 420, an inverse transform unit 430, a reconstruction unit 440, a buffer 450, and a prediction unit 460.

The optimizer 310 may fetch at least one of information about the pixels of a current block, information about the pixels of a previously decoded block, and information about a quantization step size from the buffer 350. In this case, the pixel information of the current block may be indicative of the pixels of a block to be coded that are arranged into a vector. The pixel information of a previously decoded block may be indicative of the pixels of a previously decoded block that are arranged into a vector. The quantization step size information may be indicative of a quantization step size arranged into a vector.

The optimizer 310 may obtain a transform coefficient C(i,j) based on at least one of the pixel information of the current block, the pixel information of the previously decoded block, and the quantization step size information. The transform coefficient C(i,j) may mean a dequantized transform coefficient.

The inverse transform unit 320 may receive the obtained transform coefficient C(i,j) and perform inverse transform on the received transform coefficient C(i,j). The inverse transform unit 320 may obtain a residual signal "res(i,j)" by performing inverse transform on the received transform coefficient C(i,j).

The prediction unit 330 may fetch information about the pixels of the previously decoded block from the buffer 350. The prediction unit 330 may predict the pixels of a current layer using at least one of the pixels of the previously decoded block and pixels reconstructed from a previous layer. The prediction unit 330 may obtain a prediction signal "pred(i,j)" by performing such prediction. In this case, assuming that a current block is a B×B block, a horizontal component is j, and a vertical component is i, the pixels of the current layer $L_k$ may be indicative of pixels placed at positions (k, i) and (j, k) (i=1, . . . , B, j=1, . . . , B, k=1, . . . , B). In this case, the pixels reconstructed from the previous layer may be indicative of the reconstructed pixels of all the previous layers $L_1, \ldots, L_{k-1}$. This is described in more detail with reference to FIGS. 5 and 6.

The reconstruction unit 340 may obtain a reconstructed signal "rec(i,j)" by adding the prediction signal "pred(i,j)" obtained by the prediction unit 330 and the residual signal "res(i,j)" obtained by the inverse transform unit 320. In this case, the reconstructed signal "rec(i,j)" may mean the reconstructed signal of the current layer $L_k$. The reconstructed signal "rec(i,j)" is transmitted to the buffer 350 for the future prediction of a next layer.

The transform coefficient C(i,j) obtained by the optimizer 310 is transmitted to a quantization unit 315.

The quantization unit 315 performs a quantization process and transmits quantized transform coefficient to the entropy encoding unit 360.

In this case, the transform coefficient C(i,j) may mean a Rate Distortion (RD)-optimized transform coefficient.

Furthermore, the quantization process may be performed by dividing the transform coefficient C(i,j) by the quantization step size.

The entropy encoding unit 360 may receive the quantized transform coefficient and perform entropy encoding on the received transform coefficient.

The decoder 400 of FIG. 4 may receive a signal output by the encoder 300 of FIG. 3.

The entropy decoding unit 410 may receive a bit stream and perform entropy decoding on the bit stream.

The dequantization unit 420 may obtain a transform coefficient from the entropy-decoded signal using quantization step size information.

The inverse transform unit 430 may obtain the residual signal "res(i,j)" by performing inverse transform on the transform coefficient.

The reconstruction unit 440 may obtain the reconstructed signal "rec(i,j)" by adding the residual signal "res(i,j)" and the prediction signal "pred(i,j)" obtained by the prediction unit 450. The reconstructed signal "rec(i,j)" may be transmitted to the buffer 450 and stored therein. Furthermore, the reconstructed signal "rec(i,j)" may be transmitted to the prediction unit 450 for the future prediction of a next signal.

The embodiments described with reference to the encoder 300 of FIG. 3 may be applied to the operations of the elements of the decoder 400 of FIG. 4.

A hybrid video coder to which the present invention may be applied performs efficient predictive coding by spatially predicting samples using previously decoded samples (i.e., context values) and performing transform coding on predicted errors.

In such a coding method, block transform is consecutively performed on even signals whose block transform has been partially optimized. For example, the partially optimized signals may include signals having significant inter-block correlations and signals having edge and different directional singularities. Accordingly, a spatial prediction operation may be considered to be less adaptive to an elaborate prediction process because it generates a prediction signal more adaptive to simple transform compression. Efficiency of such a prediction operation may be strongly dependent on basic processes having a Gaussian signal because the prediction operation is performed using context values.

For detailed discussions, a one-dimensional example in which a sequence $x_i$ (i=1~N) is compressed using a context sample $x_0$ is taken into consideration.

For example, x includes a series of horizontal or directional pixels from a target block on which directional prediction is to be performed using a context sample $x_0$. In this case, the context sample $x_0$ may be obtained from the boundary of a previously decoded block. The context sample $x_0$ is assumed to be available in both an encoder and a decoder. Assuming that linear prediction of $x_i$ using the context sample $x_0$ is $P_i(x_0)$, a residual signal "$r_i$" may be defined as in the following equation 4.

$$r_i = x_i - P_i(x_0) \quad \text{[Equation 4]}$$

The residual signal "$r_i$" may be represented as in the following equation 5 after it is subjected to transform coding according to a coding process, subjected to transform decoding according to a decoding process.

$$\hat{x}_i = P_i(x_c) + \hat{r}_i \quad \text{[Equation 5]}$$

In Equation 5, $\hat{x}_i$ denotes a reconstructed signal.

If an optimized linear predictor is obtained and KLT is used, the process may become gradually optimal for the compression of a Gaussian sequence. However, the process may not be suitable for many image/video structures, such as Gaussian modeling. Accordingly, in an embodiment of the present invention, a prediction method may be further improved using a better predictor using all the decoded information during a decoding process. The present invention may have an excellent effect for a video signal having an edge and directional structure.

Hereinafter, first, a basic idea is described through a one-dimensional example of the present invention. Next, connections between the present invention and DPCM are discussed by focusing on a linear predictor, and equivalent non-orthogonal transform is to be derived. Furthermore, after a codec design is discussed, compression using non-orthogonal transform and the derivation of a Rate Distortion (RD)-optimized quantization parameter are described. Finally, the details of simulation results to which the present invention may be applied are described.

After transform decoding, the decoder may have access to all of the residual samples. However, it only uses $x_0$ and $r_i$ when decoding the sample, $x_i^{th}$. In particular, when decoding $\hat{x}_{i-1}$, the decoder has already reconstructed $\hat{x}_i$, which is typically a far better predictor of compared to x0.

In the present invention, the decoding chain may be designed as following equation 6.

$$\text{transform-decode} \Rightarrow \hat{r} \Rightarrow \hat{x}_i = P'_i(x_0, P_1, \ldots, P_N) + \hat{r}_i. \quad \text{[Equation 6]}$$

Since the decoder has all of the transform-decoded residuals available, this chain and the augmented predictor $P'$ may be feasible. The corresponding encoding chain can be described as the selection of optimal coded transform coefficients which, when fed into the transform decoder in equation 6, result in $\hat{x}$ that has the minimum distortion at a given target bit-rate.

While the present invention can be generalized to non-linear prediction functions, it will keep the computationally simple, linear predictors but accomplish prediction using the closest available samples rather than using x0 everywhere. For the one-dimensional example, the present invention can construct equation 7.

$$\hat{x}_1 = P_1(x_0) + P_1 = x_0 + P_1, \quad \text{[Equation 7]}$$
$$\hat{x}_2 = P_2(\hat{x}_1) + P_2 = x_0 + P_2,$$
$$\vdots$$
$$\hat{x}_N = P_N(\hat{x}_{N-1}) + P_N = x_0 + P_1 + \ldots + P_N$$

In this case, the prediction may be linear with a prediction weight of unity. In this setting, the prediction $P_i(x_0)$ in equation 7 may be simply replaced with $P_i(\hat{x}_{i-1})$. Other weights and types of linear predictors may be straightforward generalizations.

Hereinafter, it will be explained about Relationship to DPCM and Equivalent Non-orthogonal Transforms The equation 7 resembles a first-order DPCM decoder that is operating with a prediction weight of unity. While a DPCM system will encode the residuals causally and independently, the decoder of equation 7 corresponds to decoding of residuals that have been encoded non-causally and jointly. This is due to $\hat{r}$ being the output of the transform decoder shown in equation 6. It can be said that the proposed system gains the prediction accuracy of a DPCM system while exploiting residual dependencies and other DPCM R-D inefficiencies via transform coding.

Equation 7 can lead to the matrix equation 8.

$$\hat{x} = F\hat{r} + Bx_0 \quad \text{[Equation 8]}$$

Here, F is a (N×N) lower triangular prediction matrix with equation 9.

$$F_{i,j} = \begin{cases} 1, & (i \geq j) \\ 0, & \text{otherwise} \end{cases} \quad \text{[Equation 9]}$$

This embodiment is a (N×1) matrix with unit entries. Augmenting equation 8 to accommodate transform coding, the present invention can result in equation 10.

$$\hat{x} = FT\hat{c} + Bx_0, \quad \text{[Equation 10]}$$

In equation 10, T (N×N) is the transform used in compression (e.g., the block DCT/DST in HEVC) and $\hat{c}$ are the dequantized transform coefficients. Letting G=FT, equation 10 corresponds to the transform coding of $\hat{x}-Bx_0$ with the non-orthogonal transform G via equation 11.

$$\hat{x} - Bx_0 = G\hat{c}, \quad \text{[Equation 11]}$$

In this simple linear form, the present invention may be the transform compression of $x-Bx_0$ using the non-orthogonal transform G.

Using mode-based linear predictors, the proposed decoding chain can be incorporated within a baseline hybrid codec like HEVC by designing F and B matrices and deriving the equivalent non-orthogonal transform G for each prediction mode.

Such a decoding chain will have only a marginal complexity increase compared to the baseline since all it will do is predict using the closest samples rather than the boundary samples. The encoding chain is more complex, however, because it must pick optimal coefficients to transmit for the decoding chain. Hereinafter, the present invention will provide an iterative quantization algorithm which the encoder must carry out and derive rate-distortion optimal quantization parameters.

FIGS. 5 and 6 illustrate embodiments to which the present invention may be applied and define layers illustrating a method of performing prediction using previously coded pixels.

An embodiment of the present invention provides a method of non-casually predicting a sample using previously coded pixels.

In this case, the pixels of a current block and previously coded pixels used for prediction may be determined using various methods.

In an embodiment to which the present invention may be applied, a current block may be decomposed in at least one layer unit. Accordingly, the previously coded pixels may be determined in each layer unit.

In this case, the layer unit may be variously defined based on placed pixels according to a specific criterion. For example, pixels arranged in horizontal and vertical directions based on pixels placed at the left top of a current block may be defined as a single layer. Furthermore, pixels arranged in the diagonal direction of a pixel placed at the left top may be defined as consecutive layers.

In this case, the layer may be defined as one pixel or a plurality of pixels or may be defined as all the pixels of a block. Furthermore, the layer may be defined as a set of consecutive pixels as illustrated in FIG. 5, but may be defined as a set of pixels that are not consecutive according to circumstances.

For example, referring to FIG. 5, it is assumed that a current block is a B×B block and the position of a pixel within the block is (i,j). In this case, i∈{1, 2, . . . , B}, j∈{1, 2, . . . , B}. In this case, pixels arranged in horizontal and vertical directions based on a pixel placed at the left top of the current block may be defined as a layer $L_1$. That is, a pixel placed at pixel positions (1,j) and (i,1) may be defined as the layer $L_1$.

This may be generalized as follows. For example, a pixel placed at pixel locations (k,j) and (i,k) may be defined as a layer $L_k$(k=1, 2, . . . , B).

In an embodiment to which the present invention may be applied, previously coded pixels may include the pixels of a layer that is coded right before a layer to be coded.

Referring to FIG. 6, in order to predict a current layer $L_k$, a layer $L_{k-1}$ coded right before the current layer $L_k$ may be used. In this case, in order to predict the current layer $L_k$, pixels neighboring the boundary of the current block may also be used. That is, pixels that neighbor an already decoded block neighboring the current block may be used to predict the layer $L_k$.

For example, the current layer $L_k$ may be predicted based on the reconstructed pixels of all the previous layers $L_1, \ldots, L_{k-1}$ and pixels that neighboring an already decoded block.

Another embodiments of the present invention can provide prediction formation.

The encoder can arrange coeffs(i,j), i∈{1, 2, . . . , B}, j∈{1, 2, . . . , B} into a vector c. It can be represented as equation 12.

$$C((i-1)*B+(j-1)+1)=\text{coeffs}(i,j) \qquad \text{[Equation 12]}$$

And, the encoder can arrange res(i,j), i∈{1, 2, . . . , B}, j∈{1, 2, . . . , B} into a vector r. It can be represented as equation 13.

$$r((i-1)*B+(j-1)+1)=res(i,j) \qquad \text{[Equation 13]}$$

And then, the encoder can arrange pixels from previously decoded blocks into a vector y.

In this case, the present invention can be implemented using matrix multiplication as equation 14.

$$\tilde{X}=Fr+Hy, \text{ where } \tilde{X} \text{ is the reconstructed block} \qquad \text{[Equation 14]}$$

Also, the present invention can be implemented using matrix multiplication as equation 15.

$$\tilde{X}=FTc+Hy, \text{ where } T \text{ is the matrix equivalent of the inverse transform} \qquad \text{[Equation 15]}$$

Furthermore, the present invention can be implemented using matrix multiplication as equation 16.

$$\tilde{X}=G'c+Hy, \text{ where } G'=FT \qquad \text{[Equation 16]}$$

Furthermore, the present invention can be implemented using matrix multiplication as equation 17.

$$\tilde{X}=G'c+H'y, \text{ where } G'=FT, \text{ and } F \text{ and } H \text{ are matrices optimized over training sets} \qquad \text{[Equation 17]}$$

Meanwhile, the embodiments described with reference to FIGS. 5 and 6 may be applied to intra prediction and may also be applied to various prediction modes for intra prediction. However, the present invention is not limited thereto. For example, the embodiments may also be applied to inter prediction.

FIG. 7 illustrates an embodiment to which the present invention may be applied and is a flowchart illustrating a method of performing prediction using previously coded pixels for each layer.

First, an entropy-coded coefficient may be extracted from a received bit stream. Entropy decoding may be performed on the entropy-coded coefficient at step S710 and the entropy-decoded coefficient may be dequantized at step S720, thereby being capable of obtaining a transform coefficient "coeffs (i,j)".

A residual signal "res(i,j)" may be obtained by performing inverse transform on the transform coefficient at step S730. The residual signal "res(i,j)" is used to reconstruct a current layer $L_k$.

In order to predict the pixels of the current layer $L_k$, the pixels of a previously decoded block may be used. In this case, the pixels of the current layer $L_k$ may be predicted using the reconstructed pixels of all the previous layers $L_1, \ldots, L_{k-1}$ together at step S740.

A prediction signal "pred(i,j)" generated at step S740 may be added to the residual signal "res(i,j)" obtained at step S730, thereby being capable of reconstructing the pixels of the current layer $L_k$ at step S750. A reconstructed signal "rec(i,j)" generated as described above may be used to predict a next layer.

FIG. 8 illustrates an embodiment to which the present invention may be applied and is a flowchart illustrating a quantization process for obtaining an optimized coefficient.

The present invention provides a compression method with non-orthogonal transforms.

Consider the random vector x (N×1). For notational convenience assume that the context prediction is absorbed within x. The vector x is represented using the linear transform G (N×N), whose columns $g_i$, i=1, . . . , N form the transform basis. Assume G is full rank but is otherwise general, i.e., G may be not necessarily orthogonal and $g_i$ may be not necessarily unit norm.

$$x=Gc \qquad \text{[Equation 18]}$$

In equation 18, c (N×1) are the transform coefficients. The coefficients may be scalar quantized to yield ĉ=Q(c) which are then entropy coded and transmitted to a decoder.

The scalar quantization problem with respect to the non-orthognal basis G where one aims to minimize the quantization distortion can be written as equation 19.

$$//x-G\hat{c}//$$ [Equation 19]

While the present invention can accommodate a variety of quantizers for compatibility with video coders, it will be assumed as equation 20.

$$\hat{c}=\Lambda\iota$$ [Equation 20]

In equation 20 ι (N×1) is a vector of integers and Λ is a diagonal matrix of quantizer step-sizes, i.e., $\Lambda_{i,j}=\lambda_i \delta_{i,j}$ with $\lambda_i$ the $i^{th}$ step-size and $\delta_{i,j}$ is the Kronecker delta function. Equation 21 hence may be derived.

$$//x-G\Lambda\iota//$$ [Equation 21]

Equation 21 can be recognized as a lattice quantizer whose optimal solution in terms of ι requires solving an integer problem. Many suboptimal techniques have been proposed for the solution of equation 19. In order to accommodate fast solutions, the present invention can incorporate a method similar to where one iteratively solves scalar quantization problems concentrating on each coefficient in turn. Assume all coefficients except for the $i^{th}$ coefficient have been quantized. The error vector can be defined as equation 22.

$$\varepsilon_i = x - \sum_{\{k|1\leq k\leq N, k\neq i\}} g_k \hat{c}_k.$$ [Equation 22]

Without the integer constraint, the distortion may be minimized by choosing the $i^{th}$ coefficient to be equation 23.

$$c_i^* = \underset{d}{\mathrm{argmin}}\|\varepsilon_i - g_i d\|^2 = g_i^T \varepsilon_i /(g_i^T g_i)$$ [Equation 23]

For the uniform de-quantization process in equation 20, the optimal quantized coefficient can be obtained as equation 24.

$$\hat{c}_i=\lambda_i \mathrm{round}(c_i^+/\lambda_i)=\mu(\varepsilon_i, g_i, \lambda_i)$$ [Equation 24]

This may lead to the quantization algorithm to be explained hereafter.

The encoder may perform repetitive simulations in order to obtain an optimized coefficient to be transmitted to the decoder at step S810.

If a current coefficient satisfies a specific condition as a result of a comparison between the current coefficient and a previous coefficient, the current coefficient may be determined to be an optimized coefficient. For example, assuming that the current coefficient is $C_n$ and the previous coefficient is $C_{n-1}$, whether a difference value $C_{n-1}-C_n$ between the current coefficient and the previous coefficient converges on 0 may be checked at step S820. If, as a result of the check, the difference value $C_{n-1}-C_n$ is found to converge on 0, the current coefficient $C_n$ may be determined to be an optimized coefficient and transmitted to the decoder at step S830. If, as a result of the check, the difference value $C_1-C_n$ is found to not converge on 0, the current coefficient $C_n$ may be returned so that the previous steps S810 and S820 are repeatedly performed.

In another specific condition, an optimized coefficient may be determined by comparing the difference value $C_{n-1}-C_n$ between the current coefficient and the previous coefficient with a specific threshold τ. For example, if, as a result of the comparison, the difference value $C_{n-1}-C_n$ is found to be greater than the specific threshold τ, the current coefficient $C_n$ may be returned so that the previous steps S810 and S820 are repeatedly performed. In contrast, if, as a result of the comparison, the difference value $C_{n-1}-C_n$ is found to be equal to or smaller than the specific threshold τ, the current coefficient $C_n$ may be determined to be an optimized coefficient and transmitted to the decoder.

Such an operation may be performed by the encoder of FIG. 3. For example, the operation may be performed by the optimizer 310.

FIG. 9 illustrates an embodiment to which the present invention may be applied and is a detailed flowchart illustrating a quantization process for obtaining an optimized coefficient.

In accordance with an embodiment of the present invention, the encoder may obtain an optimized coefficient based on at least one of information about the pixels of a current block, information about the pixels of a previously decoded block, and information about a quantization step size. Such an operation may be performed by the quantization unit of the encoder.

First, the encoder may obtain an initially quantized coefficient based on information about the pixels of a current block and information about the pixels of a previously decoded block at step S910. The initially quantized coefficient may be represented as in equation 25.

$$C_c = G^{-1}(x-Hy)$$ [Equation 25]

In this case, $C_0$ denotes an initially quantized coefficient, x denotes information about the pixels of a current block, and y denotes information about the pixels of a previously decoded block. In this case, G, H denotes matrices optimized on training sets. Furthermore, the matrix G may be indicative of a non-orthogonal transform matrix.

An error vector indicative of a difference between the original signal and a reconstructed signal may be obtained based on the initially quantized coefficient at step S920. In this case, the pixel information x of the current block and the pixel information y of the previously decoded block may be used, which may be represented as in equation 26.

$$e_n = x-Hy-GC_{n-1}$$ [Equation 26]

In equation 26, $e_n$ denotes an error vector, and n=0, 1, 2, . . . , which may be repeatedly performed until an optimized coefficient is obtained. For such an iteration process, a temporary vector may be defined as in equation 27.

$$t = e_n + g_k C_{n-1}(k)$$ [Equation 27]

In equation 27, t denotes a temporary vector, and $g_k$ denotes $k^{th}$ column vector of a matrix G. Furthermore, $C_{n-1}(k)$ denotes a $(n-1)^{th}$ quantized coefficient.

An $n^{th}$ quantized coefficient $C_n$ may be obtained based on the temporary vector t and quantization step size information λ(k) at step S930. In this case, equation 28 may be used.

$$C_n(k)=\lambda(k)\mathrm{round}(g_k^T t/\lambda(k)(g_k^T g_k))\ (k=1,2,\ldots,B^2)$$ [Equation 28]

In equation 28, λ(k) denotes a quantization step size that is to be used for a $k^{th}$ transform coefficient.

Furthermore, the error vector $e_n$ may be updated as in equation 29 at step S940.

$$e_n += g_k(C_{n-1}(k)-C_n(k))$$ [Equation 29]

If the $n^{th}$ quantized coefficient $C_n$ is obtained through such a process, whether a specific condition is satisfied may be checked by comparing the $n^{th}$ quantized coefficient $C_n$ with the previous coefficient $C_{n-1}$. The $n^{th}$ quantized coefficient $C_n$ may be determined to be an optimized coefficient based on a result of the comparison. For example, whether a difference value $C_{n-1}-C_n$ between the $n^{th}$ quantized coefficient $C_n$ and the previous coefficient $C_{n-1}$ converges on 9 may be checked at step S950.

If, as a result of the check, the difference value $C_{n-1}-C_n$ is found to converge on 0, the $n^{th}$ quantized coefficient $C_n$ may be determined to be an optimized coefficient and transmitted to the decoder at step S960. In contrast, if, as a result of the check, the difference value $C_{n-1}-C_n$ is found to not converge on 0, the $n^{th}$ quantized coefficient $C_n$ may be returned so that the previous steps are iterated.

In yet another specific condition, an optimized coefficient may be determined by comparing a difference value $C_{n-1}-C_n$ between a current coefficient and a previous coefficient with a specific threshold $\tau$. For example, this may be represented as in equation 30.

$$\|C_n-C_{n-1}\|_2 > \tau \quad \text{[Equation 30]}$$

If a difference value $\|C_n-C_{n-1}\|_2$ is greater than a specific threshold $\tau$, the current coefficient $C_n$ may be returned so that previous steps are iterated. In contrast, if the difference value $\|C_n-C_{n-1}\|_2$ is equal to or smaller than the specific threshold $\tau$, the current coefficient $C_n$ may be determined to be an optimized coefficient and transmitted to the decoder.

FIG. 10 illustrates an embodiment to which the present invention may be applied and is a flowchart illustrating a process of obtaining an optimized quantization step size.

As described above with reference to FIG. 9, an optimized quantization step size may be derived in a process of performing, by the encoder, quantization in order to obtain an optimized coefficient.

First, quantization step size information may be obtained from a quantization parameter value at step S1010. For example, the quantization step size information may be represented as in equation 31.

$$\Delta(k)=2^{(QP-4)/6} \quad (k=1,2,\ldots,B^2) \quad \text{[Equation 31]}$$

In equation 31, $\Delta(k)$ denotes a $k^{th}$ quantization step size, and QP denotes a quantization parameter.

Matrices and a vector to be used to obtain an optimized coefficient may be initialized at step S1020. For example, the vector and the matrices may be represented as in equations 32 and 33.

$$u(k)=1 \quad (k=1,2,\ldots,B^2) \quad \text{[Equation 32]}$$

$$\overline{G}(k,l)=G(k,l)^2 \quad (l=1,2,\ldots,B^2)$$

$$\overline{H}(k,l)=H(k,l)^2 \quad (l=1,2,\ldots,B^2) \quad \text{[Equation 33]}$$

The optimizer may obtain an optimized quantization step size based on the $k^{th}$ quantization step size $\Delta(k)$ and the initialized vector $u(k)$ and matrices $\overline{G}(k,l), \overline{H}(k,l)$ at step S1030. In this case, a convex optimization algorithm may be used.

An embodiment of the present invention can provide a method of deriving optimal quantizer step-sizes.

Rate-Distortion optimal design of quantizer step-sizes is in general a difficult problem since tractable expressions for rate and distortion are codec dependent and hard to obtain. In this embodiment, the high rate approximations can be used in order to optimize the vector of step-sizes, $\lambda$.

The transform coding recipe followed by successful image and video coders utilize scalar entropy coders. Thus the rate required to convey the quantized coefficients in $\hat{C}$ can be approximated as equation 34.

$$\mathcal{R}(\hat{c}) = \sum_k H(\hat{c}_k) \quad \text{[Equation 34]}$$

In equation 34, H( ) denotes entropy. Since coefficient $\hat{C}_i$ is scalar quantized using the step-size $\lambda_i$, the approximation can be invoked at high bit-rates.

$$H(\hat{c}_i) \approx h(c_i) - \log(\lambda_g) \quad \text{[Equation 35]}$$

In equation 35, $h(c_i)$ is the differential entropy of the continuously valued coefficient. Hence, in order to meet a rate constraint, equation 36 may be needed.

$$\sum_k \log(\lambda_k) \sim \text{constant} \quad \text{[Equation 36]}$$

Had G been orthonormal, a straightforward approximation for average distortion in terms of $\lambda$ would have been $D_{orth}(\lambda)=\Sigma_k\lambda_k^2/12$, which is obtained by assuming uniformly distributed quantization error.

With a non-orthogonal G, signal domain and coefficient domain distortions are not the same and one cannot use this approximation. Assume all quantities are zero mean. The signal domain average distortion can be written as where E[ ] denotes expectation and Tr(.) is the trace of a matrix. Using $e=G(c-\hat{C})$, equation 37 can be obtained.

$$\mathcal{D}(\lambda) = \text{Tr}(GE[(c-\hat{c})(c-\hat{c})^T]G^T) \quad \text{[Equation 37]}$$
$$= \text{Tr}(GE[pp^T]G^T)$$

In equation 37, $p=c-\hat{C}$ has been set to denote the coefficient domain error. Assuming that coefficient domain error is decorrelated, i.e., $E[pp^T]$ is diagonal with diagonal entries $n_i$, $i=1,\ldots N$, straightforward algebra yields equation 38.

$$\mathcal{D}(\lambda) = \sum_{k=1}^{N} \sum_{t=1}^{N} G_{k,t}^2 \pi_t \quad \text{[Equation 38]}$$

Since the quantization is carried out through the quantization algorithm, approximations of the form $n=\lambda_i^2/12$ are not valid. In order to relate n to $\lambda$ let us concentrate on the rounding error induced by the quantization algorithm. At the point of convergence, equation 39 can be obtained.

$$\iota_k = \hat{c}_k / \lambda_k \quad \text{[Equation 39]}$$
$$= \text{round}\left(\frac{g_k^T(e+g_k\hat{c}_k)}{(g_k^T g_k)\lambda_k}\right)$$
$$= \text{round}\left(\frac{g_k^T e}{(g_k^T g_k)\lambda_k}\right) + \iota_k,$$

Equation 39 leads to the rounding error satisfying $$\left|\frac{g_k^T e}{(g_k^T g_k)\lambda_k}\right| < 0.5.$$

Set $$\omega_k = \frac{g_k^T e}{(g_k^T g_k)}$$

and if we assume that the rounding error is uniform, equation 40 can be obtained.

$$E[(g_k^T e/(g_k^T g_k))^2] = E[\omega_k^2] \simeq \lambda_k^2/12 \quad \text{[Equation 40]}$$

Let $\hat{G}$ be the matrix with the $i^{th}$ column $$\frac{g_i}{(g_i^T g_i)}.$$

Equation 41 can be obtained.

$$\omega = \hat{G}^T e = \hat{G}^T G(c-\hat{c}) \quad \text{[Equation 41]}$$

Letting $H = \hat{G}^T G$, Equation 42 can be obtained.

$$HE[(c-\hat{c})(c-\hat{c})^T]H^T = HE[pp^T]H^T \quad \text{[Equation 42]}$$
$$= E[\omega\omega^T].$$

Considering the diagonal elements of Equation 42 may lead to Equation 43.

$$\sum_{i=1}^{N} H_{k,i}^2 \pi_i = E[\omega_k^2] \simeq \lambda_k^2/12 \quad \text{[Equation 43]}$$

Let $\overline{G}$ and $\overline{H}$ denote the matrices that have the matrix elements squared of G and H respectively. Equations 38 and 43 become equation 44.

$$D(\lambda) = u^T \overline{G} \pi \quad \text{[Equation 44]}$$

$$\overline{H}\pi = \overline{\lambda}/12$$

In equation 44, u is the vector of all-ones and $\overline{\lambda}_i = \lambda_i^2$. Accordingly, equation 45 can be obtained.

$$\mathcal{D}(\lambda) = a^T \overline{\lambda}, \text{ where } a^T = \frac{u^T \overline{G} \overline{H}^{-1}}{12} \quad \text{[Equation 45]}$$

The optimization can be put in the form of the minimization of average distortion (equation 45) subject to the rate constraint to obtain equation 46.

$$\min_{\lambda}\left\{\sum_k a_k \lambda_k^2 + \gamma \sum_k \log(\lambda_k^2)\right\} \quad \text{[Equation 46]}$$

In equation 46, γ is a Lagrange multiplier. Optimization of equation 46 yields the following equation 47.

$$\lambda_i = \sqrt{\gamma/a_i} \quad \text{[Equation 47]}$$

FIGS. 11 and 12 illustrate embodiments to which the present invention may be applied, wherein FIG. 11 illustrates test images to which the present invention has been applied and FIG. 12 illustrates percentages of rate gains to test images.

As described above, in accordance with an embodiment of the present invention, a signal having an edge and directional structure can be coded more efficiently by non-casually predicting a video signal using a transform-coded signal along with a predicted signal.

In the present simulation, intra prediction was performed on a layer of a 1-pixel thickness within a block, and the prediction process and the quantization process described with reference to FIGS. 3 to 10 were applied to the simulation.

FIG. 11 illustrates 6 test images (a)~(f), and each of the 6 images has an image feature.

Each of the 6 test images may be considered to correspond to a signal in which at least one of an edge and directional singularity significantly appears compared to other common images.

As a result of measuring the rate gains of such test images, results, such as those of FIG. 12(a), can be found. That is, from FIG. 12(a), it may be seen that effects have been improved compared to efficiency of an existing codec with respect to all the 6 test images.

It may also be seen that the images FIGS. 11(a), 11(b), and 11(e) have significant directional singularities compared to the remaining images FIGS. 11(c), 11(d), and 11(f). Accordingly, from FIG. 12(a), it may be seen that the images FIGS. 11(a), 11(b), and 11(e) have relatively higher rate gains.

Likewise, from FIG. 12(b), it may be seen that in the case of the simulation for a video sequence, effects have been improved compared to efficiency of an existing codec.

FIG. 13 illustrates an embodiment to which the present invention may be applied and is a schematic flowchart illustrating an improved predictive coding method.

First, when the original video signal is received at step S1310, the encoder may compare the original video signal with available reconstructed signals at step S1320. And, the encoder may determine a correction signal based on a result of the comparison.

In this case, the correction signal may be determined to minimize a sum of a distortion component and a rate component.

The distortion component is indicative of total distortion between the original video signal and the correction signal, and the rate component is indicative of a number of bits required to send the transform-coded correction signal. In order to determine a correction signal, the encoder may perform decoding simulations.

The encoder may generate a transform-coded correction signal based on a result of the comparison at step S1330.

And, the encoder may generate a prediction signal based on the transform-coded correction signal and the available reconstructed signals at step S1340.

And then, the encoder may reconstruct a signal by adding the transform-coded correction signal to the prediction signal at step S1350.

FIG. 14 illustrates an embodiment to which the present invention may be applied and is a schematic flowchart illustrating a method of performing quantization based on an optimized quantization step size.

An embodiment of the present invention provides a method of deriving an optimized quantization step size in a process of performing quantization in order to obtain an optimized coefficient. Quantization may be performed based on the derived quantization step size.

First, information about a quantization step size may be obtained from a quantization parameter value. In this case, the quantization step size information may mean a scaling parameter. The scaling parameter may be obtained using a Rate Distortion (RD)-optimized algorithm. For example, the scaling parameter may be determined to be a value that minimizes the sum of a distortion component and a rate component at step S1410.

A transform-coded correction signal may be obtained according to the embodiments described above with reference to FIGS. 8 to 10. For example, the transform-coded correction signal may include an optimized transform coefficient.

At step S1420, quantization may be performed on the transform-coded correction signal based on the scaling parameter determined at step S1410.

The quantized coefficient may be subjected to entropy encoding and transmitted at step S1430.

FIGS. 15 and 16 illustrate embodiments to which the present invention may be applied and are schematic block diagrams of an encoder and a decoder to which an advanced coding method has been applied through control of a quantization error.

The present invention defines a set of coding parameter to control quantization effects by manipulating factors simultaneously in three spaces: spatial, spectral, and lattice norm. Improved compression may be provided by finding optimized parameters determined using a specific type and training technology of an image compression method.

In FIG. 1, all the factors required for predictive coding, transform coding, and hybrid coding are included.

Predictive coding is based on that a signal element is predicted using a previously coded part and a difference value between a predicted value and an actual value is coded. An N-dimensional vector X is used to indicate coded data (e.g., an image or video frame), and a vector P is used to indicate a value predicted from the N-dimensional vector X. Such prediction is performed using a vector y formed from the past values of a reconstructed vector $\tilde{X}$.

First, a difference vector indicative of a prediction residual may be computed as in the following equation 48.

$$d = x - p(y) \qquad \text{[Equation 48]}$$

In general, such a difference is additionally transformed using orthogonal linear transform represented by an N×N matrix T. Thereafter, a vector coefficient is converted into an integer for entropy coding.

A vector having an integer coefficient is indicated by c and may be defined as in the following equation 49.

$$c = Q(T[x-p]), c_i \in Z, i=1,2,\ldots,N \qquad \text{[Equation 49]}$$

In general, quantization is performed using an orthogonal scaling matrix Q and may be defined as in the following equation 50.

$$c = [[QT(x-p)]] \qquad \text{[Equation 50]}$$

In equation 50, double brackets [[ ]] denotes per-element rounding as in the following equation 51.

$$c = [[v]] \iff c_i = \lfloor v_i + 0.5 \rfloor \; i=1,2,\ldots,N \qquad \text{[Equation 51]}$$

The reconstructed vector $\tilde{X}$ may be computed by both the encoder and the decoder using the following equation 52.

$$\tilde{X} = p + T^{-1}Q^{-1}c \qquad \text{[Equation 52]}$$

In equation 52, $\tilde{X}$ denotes a reconstructed vector, p denotes a prediction vector, T denotes a transform matrix, Q denotes a quantization matrix, and c denotes a transform coefficient.

If the matrix T is defined by transform, such as DCT, the application of such transform is almost the same as that the spectral component of a residual vector d is computed. Accordingly, in an embodiment of the present invention, the distribution of quantization errors in a frequency domain may be changed using different values of a diagonal matrix Q.

All the elements within the vector of an image or video block may not be used in the same way when inter block prediction is performed. Accordingly, prediction precision may be significantly reduced due to the errors of some elements present at the boundary of a block.

Furthermore, if linear transform, such as DCT, is independently applied to a vector, a blocking artifact may be generated at the boundary of a block.

In this case, importance is different in each of errors occurring in other parts of a block. In an embodiment of the present invention, a blocking artifact can be reduced by providing a method of controlling a quantization error more finely on a space domain. However, an approach using a diagonal matrix Q may be controlled only in a frequency domain. Accordingly, the present invention can solve such a problem by controlling a quantization error in both the space domain and the frequency domain.

Referring to FIG. 15, the encoder 1500 to which the present invention may be applied may include an optimizer 1520, a dequantization unit 1530, an inverse transform unit 1540, a buffer 1550, a prediction unit 1560, and an entropy encoding unit 1570. In this case, the inverse transform unit 1540 may include a spatial scaling unit 1545.

Referring to the encoder 1500 of FIG. 15, the optimizer 1520 may obtain an optimally quantized transform coefficient.

First, the optimizer 1520 may obtain an optimally quantized transform coefficient through a training step. For example, the optimizer 1520 may compute an optimized set of diagonal matrices S, W, and Q from a viewpoint of Rate Distortion (RD).

An embodiment of the present invention provides a method of adding another diagonal matrix S, that is, a scaling factor on a space domain. In such a case, a process for reconstructing a signal may be changed as in the following equation 53.

$$x = p + ST^{-1}Q^{-1}c \qquad \text{[Equation 53]}$$

An orthogonal condition on which an optimized transform coefficient is calculated using simple rounding as in Equation 3 may be changed. Accordingly, in an embodiment of the present invention, an optimized transform coefficient may be calculated based on the following equation 54.

$$c = \underset{a \in Z^N}{\arg\min}\{\mathcal{D}_w(x - p - ST^{-1}Q^{-1}a)\}, \qquad \text{[Equation 54]}$$

$$\text{where } D_w(v) = v^T W^2 v$$

In Equation 54, W denotes another diagonal matrix used to differentiate the importance of errors in the spatial-domain.

Furthermore, in an embodiment of the present invention, in order to find an optimized set of the diagonal matrices S, W, and Q, objective distortion measurement, such as a Mean Squared Error (MSE), and another distortion measurement including subjective factors, such as the visibility blocking art acts, may be used.

Furthermore, prior to the coding of an image or video frame, the values of diagonal matrices S, W, and Q, that is, side information, may be encoded. In this case, a proper protocol that may be recognized by the decoder may be used.

The dequantization unit 1530 may obtain a transform coefficient by performing dequantization on the optimally quantized transform coefficient.

The inverse transform unit 1540 may obtain a predicted error vector by performing inverse transform on the transform coefficient. In this case, the inverse transform may include a scale orthogonal matrix S. By adding the scaling matrix on the space domain as described above, a quantization error can be controlled even on the space domain.

Scaling using the scale orthogonal matrix S may be performed by the spatial scaling unit 1545 of the inverse transform unit 1540. Furthermore, the spatial scaling unit 1545 may be placed after the inverse transform process of the inverse transform unit 1540.

A reconstructed signal may be generated by adding the obtained predicted error vector to a prediction signal output by the prediction unit 1560.

The buffer 1550 stores the reconstructed signal for the future reference of the prediction unit 1560. The prediction unit 1560 generates a prediction signal using a previously reconstructed signal stored in the buffer 1550.

The optimally quantized transform coefficient obtained by the optimizer 1520 may be transmitted to the entropy encoding unit 1570. The entropy encoding unit 1570 may perform entropy encoding on the optimally quantized transform coefficient and output the resulting transform coefficient.

Referring to FIG. 16, the decoder 1600 to which the present invention may be applied may include an entropy decoding unit 1610, a dequantization unit 1620, an inverse transform unit 1630, a buffer 1640, and a prediction unit 1650. In this case, the inverse transform unit 1630 may include a spatial scaling unit 1635.

The decoder 1600 of FIG. 16 receives a signal output by the encoder 1500 of FIG. 15. The received signal is subjected to entropy decoding through the entropy decoding unit 1610.

The dequantization unit 1620 obtains a transform coefficient from the entropy-decoded signal using quantization step size information. The inverse transform unit 1630 obtains a predicted error by performing inverse transform on the transform coefficient. In this case, the inverse transform may include a scale orthogonal matrix S.

Scaling using the scale orthogonal matrix S may be performed by the spatial scaling unit 1635 of the inverse transform unit 1630. The spatial scaling unit 1635 may be placed after the inverse transform process of the inverse transform unit 1630. Furthermore, the embodiments described with reference to FIG. 15 may be applied.

A reconstructed signal is generated by adding the obtained predicted error to a prediction signal output by the prediction unit 1650.

The buffer 1640 stores the reconstructed signal for the future reference of the prediction unit 1650. The prediction unit 1650 may generate a prediction signal using a previously reconstructed signal stored in the buffer 1640.

FIG. 17 illustrates an embodiment to which the present invention may be applied and is a flowchart illustrating a process of obtaining a scaling diagonal matrix through a Rate Distortion (RD) optimization process.

In the form of coding defined by equation 46, an approximated reproduction of pixels values can be obtained because $c \in Z^N$, i.e., the vector of data to be coded can only have integer values.

The present invention can model the approximation using statistical methods, by defining an additive error vector e.

$$T^{-1}Q^{-1}c = x - p + e \qquad \text{[Equation 55]}$$

The rounding errors in each component of c can be combined through multiplication by the orthogonal matrix T. For high-rate approximations, we can assume that components of e are independent random Gaussian variables, with zero mean and same variance. Thus, the values obtained from equation 46 yields equation 56.

$$\tilde{x} = p + T^1 Q^1 c = x + e \qquad \text{[Equation 56]}$$

Equation 56 means that errors have roughly the same distribution for all pixels in a block.

With the new approach defined by equation 57, the residual values x−p pre-scaled by S−1 to obtain the proper reproduction.

$$ST^{-1}Q^{-1}c = S[S^{-1}(x-p) + e] \qquad \text{[Equation 57]}$$

The elements of e are independent random Gaussian variables, with zero mean and same variance.

However, in this case we have reproduced pixels given by equation 58.

$$\tilde{x} = p + S\,T^{-1}Q^{-1}c = x + Se \qquad \text{[Equation 58]}$$

Equation 52 means that now the error in each pixel has different variances, proportional to the scaling factors in diagonal matrix S. Larger values of $S_{i,i}$ thus produce relatively larger error variances, and vice-versa.

In the following we present a somewhat more detailed description of the invention. The present invention can be applied for each pre-defined video segment, for example, coding unit, frame, tile, slice, etc.

At the encoder, the present invention can be performed according to the following steps.

First, the encoder can choose the matrices S, W, and Q to be used for coding pixel blocks within the segment.

Next, before coding pixels in each segment, the encoder can add to the compressed bitstream the information about matrices S and Q. For example, T is assumed constant, and W is only used by the encoder.

And then, for each pixel block, the encoder can find the optimal vector $c \in Z^N$, entropy code its value, and add it to the compressed bitstream.

At the decoder, the present invention can be performed according to the following steps.

First, before decoding pixels in each segment, the decoder can read from the compressed bitstream the information about matrices S and Q.

And then, for each pixel block, the decoder can entropy decode the vector $c \in Z^N$, and compute reconstructed pixel values using equation 59.

$$\tilde{x} = p + ST^1 Q^1 c \qquad \text{[Equation 59]}$$

An embodiment of the present invention provides a process of obtaining a scaling diagonal matrix through a Rate Distortion (RD) optimization process.

First, the encoder may perform an RD optimization process through training at step S1710. For example, such an RD optimization process may be performed by the optimizer 1520.

An optimized set of diagonal matrices S, W, and Q may be computed through the RD optimization process at step S1720.

The values of the diagonal matrices S, W, and Q may be encoded into side information at step S1730.

Thereafter, a video signal may be coded or decoded according to the processes described with reference to FIGS. 15 and 16 at step S1740.

For example, the scaling diagonal matrix S of the diagonal matrices may be used in the inverse transform unit 1540 of the encoder 1500 or the inverse transform unit 1630 of the decoder 1600 so that a quantization is controlled error even on the space domain.

FIG. 18 illustrates an embodiment to which the present invention may be applied and is a graph illustrating a comparison between the coding gains of respective images in the case in which coding is performed using an optimized scaling matrix and the case in which coding is performed using an existing method.

FIG. 18 illustrates relations between control of error transfer and coding gains.

Dotted lines in the graph denote the coding gains of a common codec, and solid lines denote coding gains when optimized diagonal matrices are used.

The present embodiment corresponds to a case where planar prediction and 4×4 DCT are used. It may be seen that better coding efficiency is obtained when all the optimized diagonal matrices are used in three test images, "Woman", "Bike", and "Café".

This is only an embodiment of the present invention, and the present invention is not limited to the aforementioned conditions and may be applied to embodiments having other conditions.

FIGS. 19 and 20 are embodiments to which the present invention may be applied and are schematic block diagrams illustrating an encoder and a decoder to which an advanced coding method may be applied.

The encoder 1900 of FIG. 19 includes an optimizer 1910, a quantization unit 1920, and an entropy encoding unit 1930. The decoder 2000 of FIG. 20 includes an entropy decoding unit 2010, a dequantization unit 2020, an inverse transform unit 2030, and a reconstruction unit 2040.

Referring to the encoder 1900 of FIG. 19, the optimizer 1910 obtains an optimized transform-coded correction signal. The optimizer 1910 may use the following embodiments in order to obtain the optimized transform-coded correction signal.

In order to illustrate an embodiment to which the present invention may be applied, first, a reconstruction function for reconstructing a signal may be defined as follows.

$$\tilde{x} = R(c, y) \quad \text{[Equation 60]}$$

In Equation 60, $\tilde{x}$ denotes a reconstructed signal, c denotes a decoded transform-coded correction signal, and y denotes a context signal. $R(c,y)$ denotes a reconstruction function using c and y in order to generate a reconstructed signal.

In the present embodiment, a reconstruction function may be defined as a relationship between previously reconstructed values and a transform-coded correction signal. Accordingly, the decoded correction signal affects not only the reconstruction value, but also the entire reconstruction process and the choice of reconstruction functions.

For example, a correction signal may be defined as follows.

$$e = Tc \quad \text{[Equation 61]}$$

In Equation 61, e denotes a correction signal, c denotes a transform-coded correction signal, and T denotes a transform matrix. Also, in some cases, the correction signal may mean error signal or prediction error signal.

In this case, a reconstructed signal may be defined as follows.

$$\tilde{x}_1 = R_1(e, y) \quad \text{[Equation 62]}$$
$$\tilde{x}_2 = R_2(e, y, \tilde{x}_1)$$
$$\vdots$$
$$\tilde{x}_n = R_n(e, y, \tilde{x}_1, \tilde{x}_2, \ldots, \tilde{x}_{n-1})$$

In Equation 62, $\tilde{x}_n$ denotes an $n^{th}$ component of the reconstructed signal, e denotes the correction signal, and y denotes a context signal. $R_n$ denotes a reconstruction function using e, y and $\tilde{x}$ in order to generate a reconstructed signal.

In one embodiment, the reconstruction function $R_n$ may be defined as follows.

$$R_1(e_1, y) = P_1(y) + e_1 \quad \text{[Equation 63]}$$
$$R_2(e_2, y, \tilde{x}_1) = P_2(y, \tilde{x}_1) + e_2$$
$$\vdots$$
$$R_n(e_n, y, \tilde{x}_1, \ldots, \tilde{x}_{n-1}) = P_n(y, \tilde{x}_1, \tilde{x}_2, \ldots, \tilde{x}_{n-1}) + e_n$$

In Equation 63, $P_n$ denotes a type of prediction function formed of the parameters in order to generate a prediction signal.

The prediction function may be, for example, a median function, a combination of a rank order filter and a non-linear function, or a combination of linear functions. Furthermore, each of the non-linear prediction function $P_n(\ )$ may be a different non-linear function.

In another embodiment of the present invention, a quantization unit 1920 may be included in the optimizer 1910, or the optimizer 1910 may include transform unit.

In another embodiment of the present invention, the encoder 1900 and the decoder 2000 may include a storage unit of candidate functions for selecting the non-linear prediction function.

In this case, the optimized non-linear prediction function may be selected from candidate functions stored in the storage unit.

When an optimized non-linear prediction function is selected as described above, the optimizer 1910 may generate an optimized prediction signal using the optimized non-linear prediction function. And, the optimizer 1910 may generate an optimized prediction error signal based on the optimized prediction signal, and may perform transform coding on the optimized prediction error signal. The optimizer 1910 may output a transform-coded coefficient through the transform coding. In this case, the transform-coded coefficient may mean an optimized transform coefficient.

The output transform coefficient is transmitted to the quantization unit 1920. The quantization unit 1920 quantizes the transform coefficient and sends the quantized transform coefficient to the entropy encoding unit 1930.

The entropy encoding unit 1930 may perform entropy encoding on the quantized transform coefficient and output a compressed bit stream.

The decoder 2000 of FIG. 20 may receive the compressed bit stream from the encoder of FIG. 19, may perform entropy decoding through the entropy decoding unit 2010, and may perform dequantization through the dequantization unit 2020. In this case, a signal output by the dequantization unit 2020 may mean an optimized transform coefficient.

The inverse transform unit 2030 receives the optimized transform coefficient, performs an inverse transform process, and may obtain a prediction error signal through the inverse transform process.

The reconstruction unit 2040 may obtain a reconstructed signal by adding the prediction error signal and a prediction signal together. In this case, various embodiments described with reference to FIG. 19 may be applied to the prediction signal.

FIG. 21 is an embodiment to which the present invention may be applied and is a schematic flowchart illustrating an advanced video coding method.

First, when the original video signal is received at step S2110, the encoder may compare the original video signal with available reconstructed signals at step S2120. And, the encoder may determine a correction signal based on a result of the comparison at step S2130.

In this case, the correction signal may be determined to minimize a sum of a distortion component and a rate component. The distortion component is indicative of total distortion between the original video signal and the correction signal, and the rate component is indicative of a number of bits required to send the transform-coded correction signal. In order to determine a correction signal, the encoder may perform decoding simulations.

This invention may further comprise determining a reconstruction function to be used for the signal reconstruction, and the reconstruction function includes at least one of a linear component and a non-linear component.

And, the reconstruction function may be determined based on all the previously reconstructed samples and the correction signal.

And then, the encoder may generate a transform-coded correction signal to be transmitted for a signal reconstruction at step S2140. Here, the transform-coded correction signal may be multiplied by a dequantization matrix and an inverse-transform matrix, and wherein the dequantization matrix may be selected for controlling a bit-rate and quantization errors.

Furthermore, the transform-coded correction signal may correspond to the correction signal for a group of pictures and a spatiotemporal transform coding may has been applied to the correction signal.

In accordance with an embodiment of the present invention, the decoder may receive a bit stream including a transform-coded correction signal obtained according to the present invention, may perform entropy decoding through the entropy decoding unit, may perform dequantization through the dequantization unit, and may perform inverse transform through the inverse transform unit. The decoder may obtain a correction signal by performing inverse-transform to the transform-coded correction signal.

And then the decoder may obtain a reconstructed signal using a reconstruction function that combines the obtained correction signal and a context signal. Here, the context signal may be obtained based on all previously reconstructed samples.

Furthermore, the decoder may determine a reconstruction function to be used for the signal reconstruction, and the reconstruction function may include at least one of a linear component and a non-linear component. Here, the reconstruction function may be determined based on all the previously reconstructed samples and the correction signal.

The transform-coded correction signal may be multiplied by a dequantization matrix and an inverse-transform matrix. Also, the transform-coded correction signal may correspond to the correction signal for a group of pictures and a spatiotemporal transform coding has been applied to the correction signal.

As described above, the decoder and the encoder to which the present invention may be applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional (3D) video apparatus, a teleconference video apparatus, and a medical video apparatus and may be used to code video signals and data signals.

Furthermore, the decoding/encoding method to which the present invention may be applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves (e.g., transmission through the Internet). Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of encoding a video signal, comprising:
receiving the video signal including a current block, wherein the current block includes at least one layer, and the at least one layer includes pixels arranged in horizontal and vertical directions based on a pixel placed in a diagonal direction within the current block;
obtaining a prediction signal for a current layer $L_k$ based on reconstructed pixels of all previous layers $L_1, \ldots, L_{k-1}$;
obtaining a residual signal for the current layer $L_k$ based on the prediction signal;
obtaining an optimal quantized coefficient for the current layer $L_k$ based on an optimization process for the residual signal; and
entropy-encoding the optimal quantized coefficient for the current layer $L_k$, wherein the optimal quantized coefficient is a value minimizing a difference between a quantized coefficient for the current layer $L_k$ and a quantized coefficient for a previous layer $L_{k-1}$.

2. The method of claim 1,
wherein the optimal quantized coefficient is determined when the difference is smaller than or equal to a predetermined threshold value.

3. The method of claim 1,
wherein the optimization process is repeatedly performed when the difference is greater than a predetermined threshold value.

4. The method of claim 1, in a step of obtaining the prediction signal,
wherein a first layer within the current block is predicted based on pixels of a previously coded neighboring block, and a remaining layer is predicted based on pixels of a previous layer, and
wherein the first layer includes boundary pixels arranged in horizontal and vertical directions based on a left-top pixel of the current block.

5. The method of claim 1,
wherein a nonorthogonal transform matrix is used to obtain the optimal quantized coefficient.

6. A method of decoding a video signal including a current block, comprising:
receiving the video signal including an optimal quantized coefficient for a current layer $L_k$, wherein the current block includes at least one layer, and the at least one layer includes pixels arranged in horizontal and vertical directions based on a pixel placed in a diagonal direction within the current block;
obtaining a residual signal for the current layer $L_k$ based on the optimal quantized coefficient;
obtaining a prediction signal for the current layer $L_k$ based on reconstructed pixels of all previous layers $L_1, \ldots, L_{k-1}$; and
reconstructing the video signal by adding the residual signal to the prediction signal,
wherein the optimal quantized coefficient is a value which has minimized a difference between a quantized coefficient for the current layer $L_k$ and a quantized coefficient for a previous layer $L_{k-1}$.

7. The method of claim 6, further comprising:
extracting a quantization parameter from the video signal;
performing a de-quantization to the optimal quantized coefficient for the current layer $L_k$ based on the quantization parameter; and
performing an inverse-transform for the optimal quantized coefficient for the current layer $L_k$,
wherein the residual signal for the current layer $L_k$ is obtained by the inverse-transform.

8. The method of claim 7,
wherein an optimal quantization step size is derived from the quantization parameter, and the de-quantization is performed by using the optimal quantization step size.

9. The method of claim 6, in a step of obtaining the prediction signal,
wherein a first layer within the current block is predicted based on pixels of a previously coded neighboring block, and a remaining layer is predicted based on pixels of a previous layer, and
wherein the first layer includes boundary pixels arranged in horizontal and vertical directions based on a left-top pixel of the current block.

10. The method of claim 6,
wherein a nonorthogonal transform matrix is used to obtain the residual signal for the current layer $L_k$.

11. An apparatus of encoding a video signal, comprising:
a processor configured to
receive the video signal including a current block,
obtain a prediction signal for a current layer $L_k$ based on reconstructed pixels of all previous layers $L_1, \ldots, L_{k-1}$,
obtain a residual signal for the current layer $L_k$ based on the prediction signal,
obtain an optimal quantized coefficient for the current layer $L_k$ based on an optimization process for the residual signal, and
entropy-encode the optimal quantized coefficient for the current layer $L_k$,
wherein the current block includes at least one layer, and the at least one layer includes pixels arranged in horizontal and vertical directions based on a pixel placed in a diagonal direction within the current block, and
wherein the optimal quantized coefficient is a value minimizing a difference between a quantized coefficient for the current layer $L_k$ and a quantized coefficient for a previous layer $L_{k-1}$.

12. The apparatus of claim 11,
wherein the optimal quantized coefficient is determined when the difference is smaller than or equal to a predetermined threshold value.

13. The apparatus of claim 11,
wherein the optimization process is repeatedly performed when the difference is greater than a predetermined threshold value.

14. The apparatus of claim 11,
wherein a first layer within the current block is predicted based on pixels of a previously coded neighboring block, and a remaining layer is predicted based on pixels of a previous layer, and
wherein the first layer includes boundary pixels arranged in horizontal and vertical directions based on a left-top pixel of the current block.

15. The apparatus of claim 11,
wherein a nonorthogonal transform matrix is used to obtain the optimal quantized coefficient.

16. An apparatus of decoding a video signal including a current block, comprising:
a processor configured to
receive the video signal including an optimal quantized coefficient for a current layer $L_k$,
obtain a residual signal for the current layer $L_k$ based on the optimal quantized coefficient,
obtain a prediction signal for the current layer $L_k$ based on reconstructed pixels of all previous layers $L_1, \ldots, L_{k-1}$, and
reconstruct the video signal by adding the residual signal to the prediction signal,
wherein the current block includes at least one layer, and the at least one layer includes pixels arranged in horizontal and vertical directions based on a pixel placed in a diagonal direction within the current block, and
wherein the optimal quantized coefficient is a value which has minimized a difference between a quantized coefficient for the current layer $L_k$ and a quantized coefficient for a previous layer $L_{k-1}$.

17. The apparatus of claim 16, further comprising:
the processor configured to
extract a quantization parameter from the video signal,
perform a de-quantization to the optimal quantized coefficient for the current layer $L_k$ based on the quantization parameter, and
perform an inverse-transform for the optimal quantized coefficient for the current layer $L_k$,
wherein the residual signal for the current layer $L_k$ is obtained by the inverse-transform.

18. The apparatus of claim 16,
wherein a nonorthogonal transform matrix is used to obtain the residual signal for the current layer $L_k$.

* * * * *